July 16, 1957

E. J. DIETERICH 2,799,845

TIME SELECTION DEVICES

Filed July 23, 1953

INVENTOR
ERNEST J. DIETERICH
BY Elmer J. Gorn
ATTORNEY

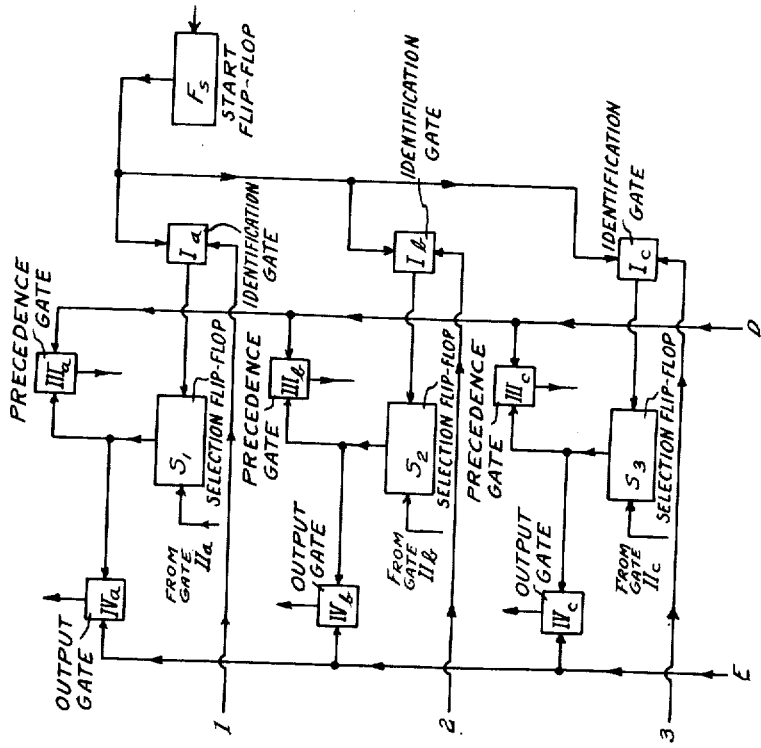
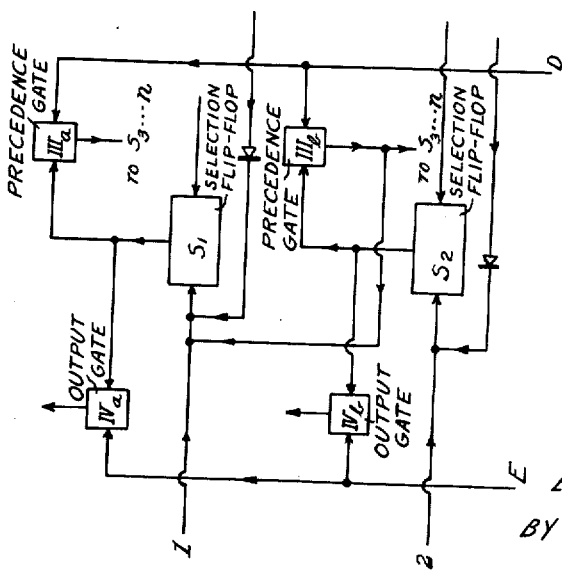

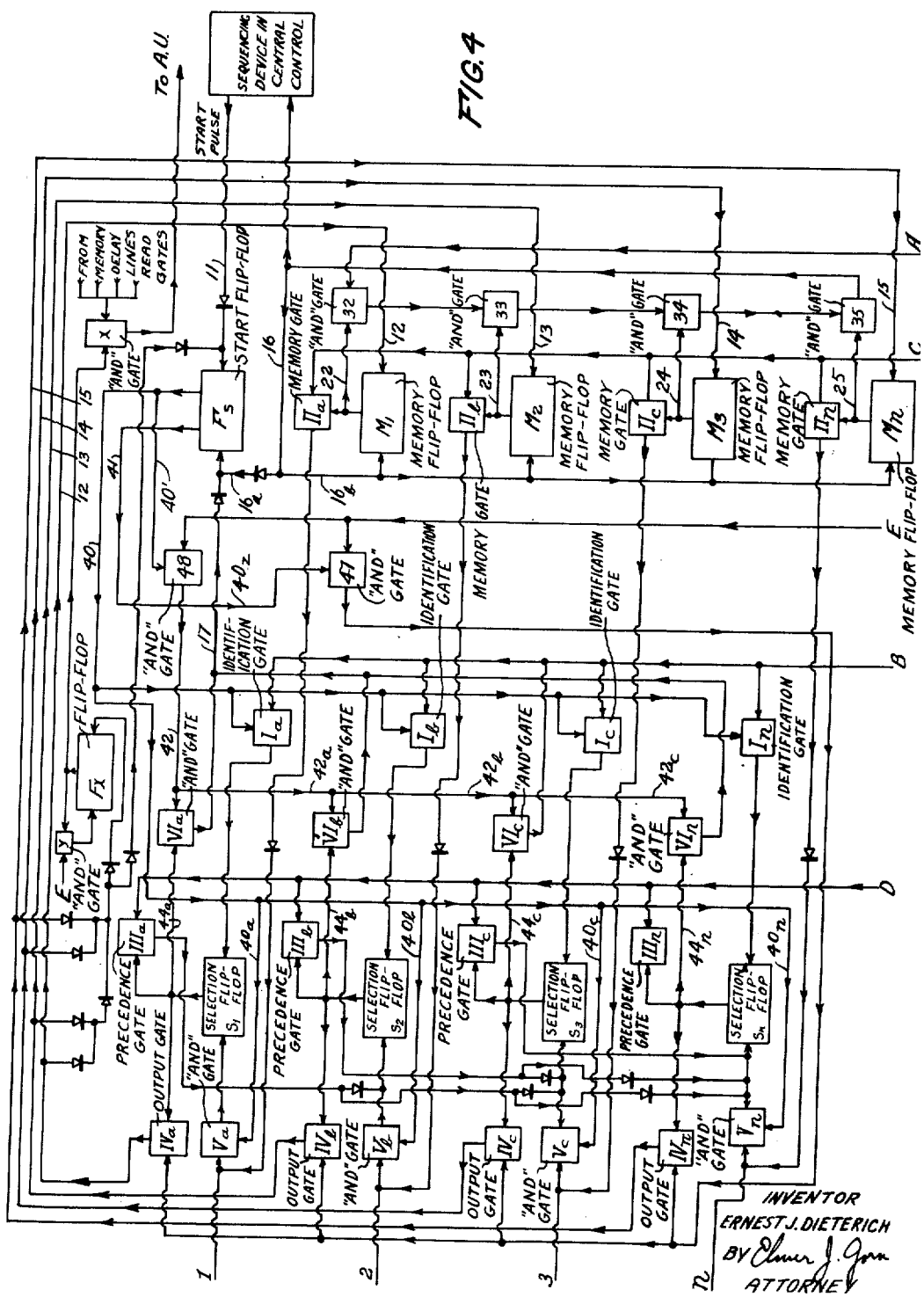

July 16, 1957  E. J. DIETERICH  2,799,845
TIME SELECTION DEVICES
Filed July 23, 1953  9 Sheets-Sheet 4

INVENTOR
ERNEST J. DIETERICH
BY
ATTORNEY

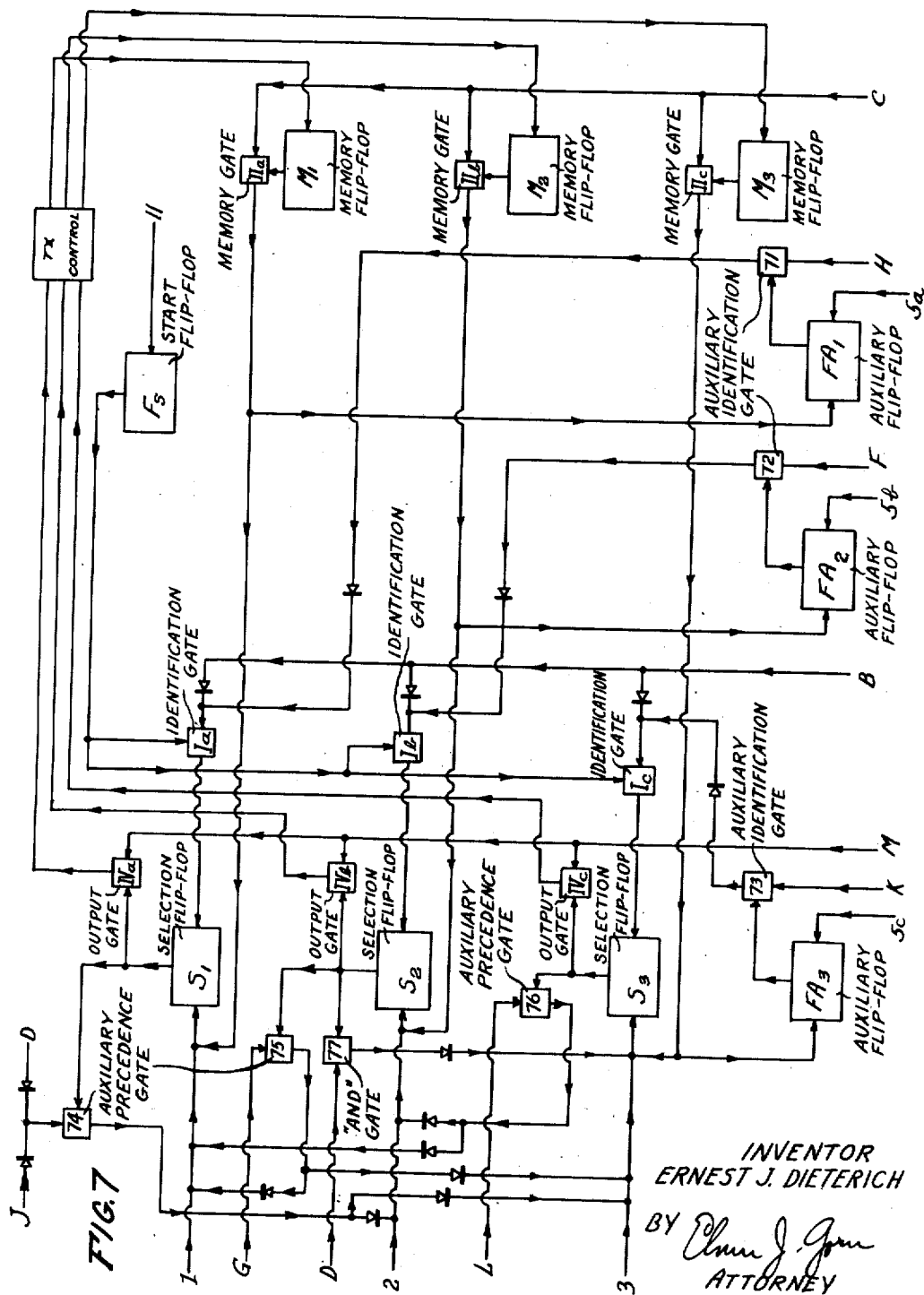

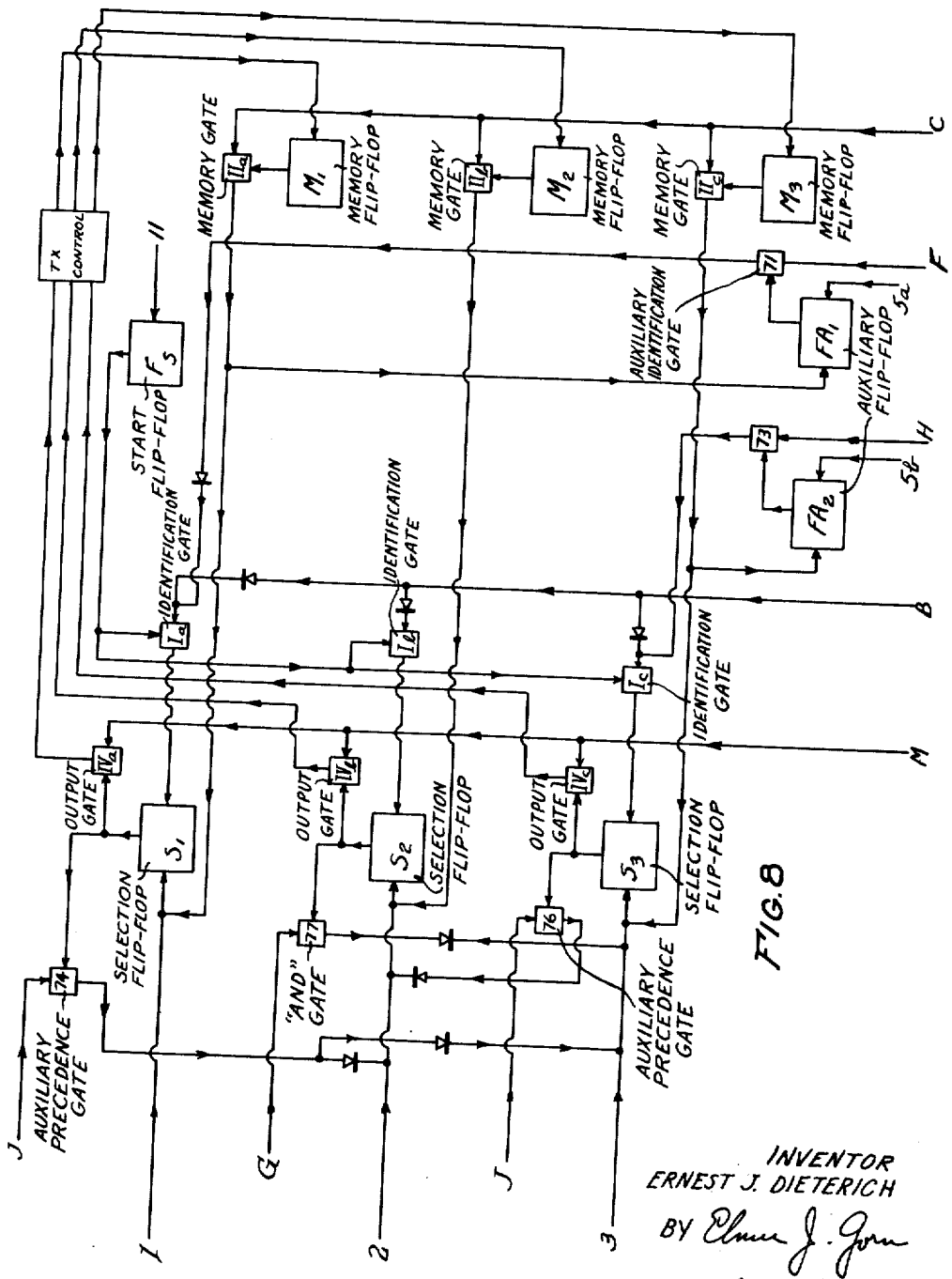

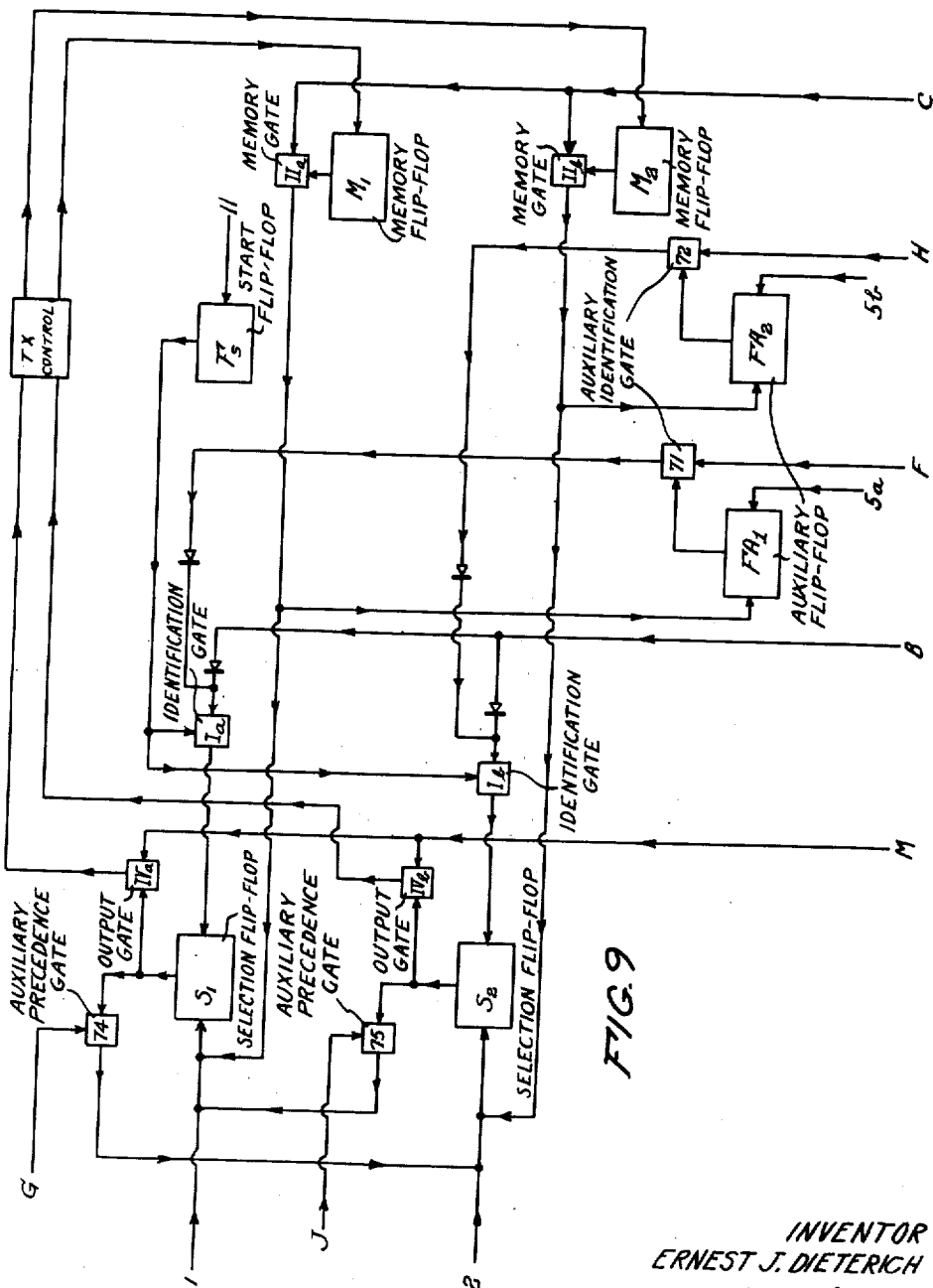

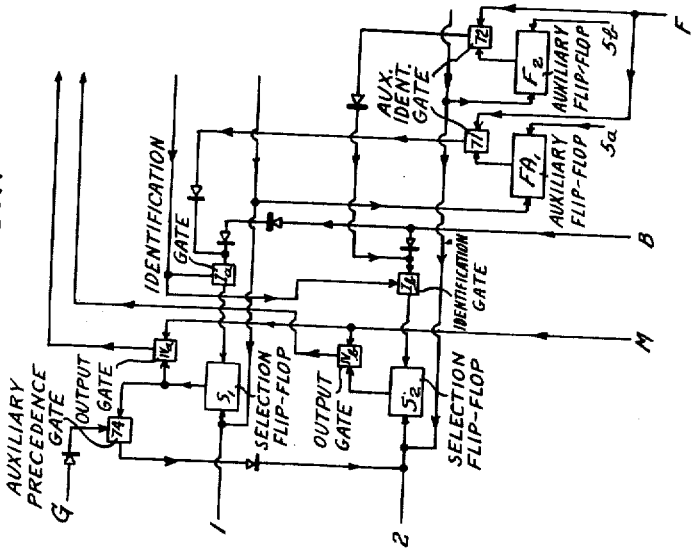
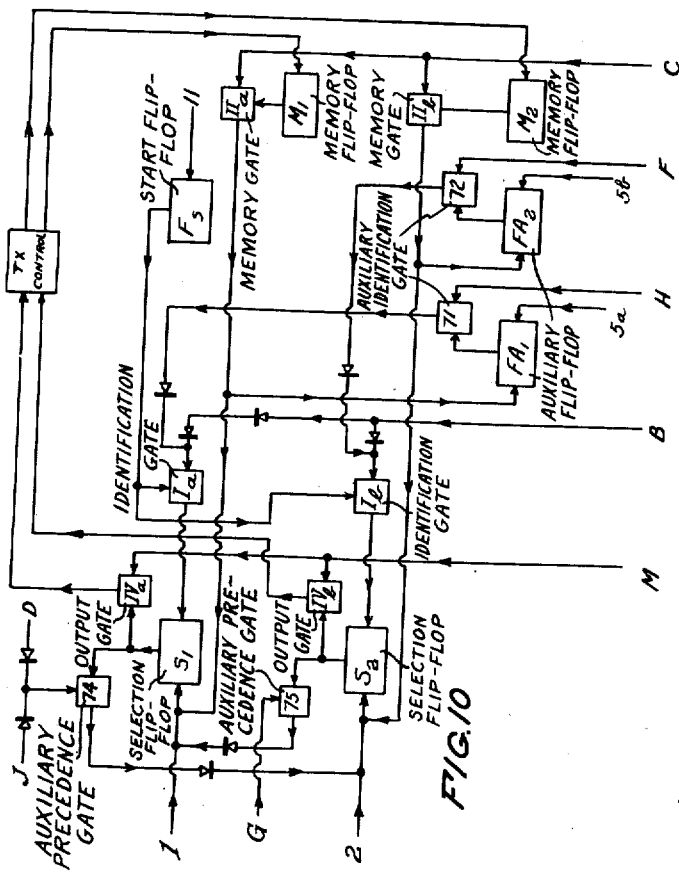

July 16, 1957
E. J. DIETERICH
2,799,845
TIME SELECTION DEVICES
Filed July 23, 1953
9 Sheets-Sheet 9
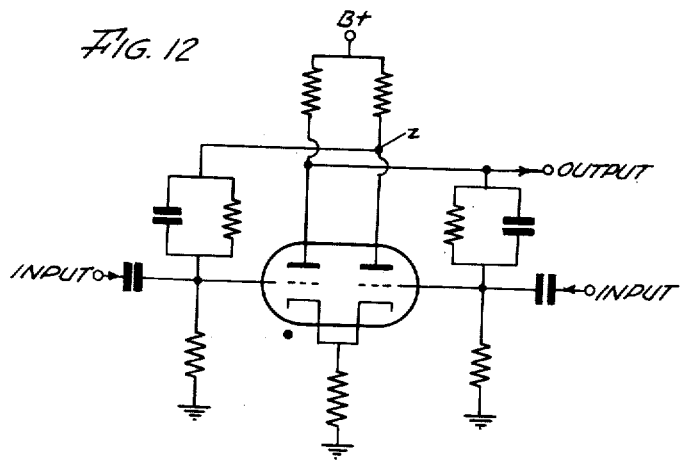
INVENTOR
ERNEST J. DIETERICH
BY Elmer J. Gorn
ATTORNEY

United States Patent Office 2,799,845
Patented July 16, 1957

2,799,845

TIME SELECTION DEVICES

Ernest J. Dieterich, Watertown, Mass., assignor to Raytheon Manufacturing Company, Newton, Mass., a corporation of Delaware Application July 23, 1953, Serial No. 369,814

40 Claims. (Cl. 340—174)

This invention relates to means for reducing the mean time required for selection of information stored in a serial memory.

In many applications it is necessary to store information available from some input source until some later time at which it is convenient to utilize a portion or all of said information. Such a storage means may be referred to as a memory device, or, more simply, as a memory. The available information is inserted or written into the memory by appropriate means and may be read or extracted from the memory whenever desired by some other means.

Information quite often is stored in a serial type memory which may be defined as a device for storing information in such a manner that the storage space for each discrete group of information is available to the reading and writing device not continuously but periodically. The unit of digital information may be referred to as a word and the amount of storage space required for one word will be referred to as a cell or memory position. Each cell in the serial memory maintains its identity even though it may not contain any information.

In a serial memory the time required for transmission of one word (including the space, if any, between words) is referred to as a minor cycle. If the memory device is capable of storing $\beta$ words, one circulation of information in said memory device requires $\beta$ minor cycles, during which time each word stored appears at the output of the memory, and is thus available for transmission to the reading and writing devices, exactly once. The time required for one such circulation, that is, the period of the serial memory, may be referred to either as a memory cycle or a major cycle. A major cycle in a memory device which provides serial access to storage positions may also be defined as the time interval between successive appearance of a given storage or memory position in said memory device.

The access time of the memory, that is, the time required to withdraw a word from storage, is dependent upon the number of words stored therein. Because of the large volume of information which must be accommodated in practice it is customary to use several serial memory devices in parallel and to synchronize each of said memory devices. This may be referred to as serial-parallel storage.

In certain applications of serial memory device, particularly in digital computers, it is sometimes necessary that certain of the serial memory devices contain information in the form of addresses which designate a particular location in the memory.

Each memory cell which is not empty will contain either a number to be operated upon or an order containing a number of addresses dependent upon the design of the device with which the serial-parallel memory is to be used. It is, of course, possible that a word (number or order) may be stored partly in one memory device and partly in another or several other memory devices. This does not alter the basic concepts of a minor cycle and the time of availability.

At least part of each address is representative of the time of availability of the memory cell to which the address refers. In the event that several memory devices are used, another portion of the address designates the particular memory device in which the word is to be found. This invention, however, is concerned only with the time portion of the addresses.

Transmission of information to or from a particular memory cell in a serial memory requires some means of identifying the time associated with each address. This may be referred to as time selection. For simplicity in explanation, the phrase "selection of addresses" or equivalent phrases will be used to indicate selection of cells in the serial memory corresponding to said addresses. This means for making the necessary time identification will be assumed to exist external to the time selection device of the subject invention. The specific means for making this time identification is not the subject of this invention. It has been found that the transmission of information between the memory and external associated equipment may be made less complicated and expensive if only one transmission bus is employed. It sometimes happens that more than one address at a time is presented for selection. The selection time may be reduced, even where only one bus is available for transmission of information to or from the memory, by selecting first whichever address corresponds to the earliest available cell time, next the address with the second available cell time, and so forth. It may also happen that two or more addresses refer to the same time or that the transmission bus is dead for some time before or after each transmission, so that conflicts between addresses arise. In this case provision must be made in the time selection device for choosing one address to be selected immediately and for postponing until a later memory cycle selection of the other addresses. In other words, the time selector must establish an order of precedence among those addresses being presented which refer to the same cell time, prevent more than one cell from having access to the transmission bus at one time, and allow the unselected addresses to have precedence on succeeding memory cycles.

It is sometimes desirable to treat certain addresses specially, that is, to select one or more addresses independent of time.

It is also desirable occasionally to select an address or group of addresses in a fixed sequence, that is, to afford priority to one or more addresses regardless of time at which said addresses are presented for selection in relation to other addresses.

Finally it is sometimes desirable to inhibit the selection of a certain address or addresses until some subsequent memory cycle.

The specific means for accomplishing the purposes of this invention will be set forth in considerable detail subsequently.

Before proceeding further it should be stated that this invention is not restricted to any particular means of presentation of information and is not to be limited to use with computers. Since this time selection device is so readily adaptable to use in digital computers, however, a basic description of certain details of a digital computer is in order.

One form of digital computer comprises essentially an internal serial memory, an arithmetic unit and a central control. The serial memory, as already indicated, is a storage place for numbers and orders. During computation, numbers to be operated upon are transferred from the internal memory to the arithmetic unit, where the arithmetic operations occur. The result of each arithmetic operation is returned to the internal memory. The central control unit of the computer governs the exchange of numbers between the internal memory and the arithmetic unit in accordance with orders or commands which are also located in the internal memory. For each arithmetic operation, the central control must select operands from the internal memory and must supply these to the arithmetic unit. The central control must designate to the arithmetic unit which operation (such as addition, multiplication, etc.) is to be performed and must transfer the result of the operation to a selected memory position. The central control then initiates the next operation by selecting from the internal memory the next command, and so on.

In the digital computer to be described by way of example, each word is a composite pulse group containing a plurality of electrical pulse positions or binary digits. As is well known, the binary system comprises the digits 0 and 1; the digit 1 is represented by the presence of a pulse and the digit 0 by the absence of a pulse. A binary number comprises a series of these binary digits. Each digit must retain its identity throughout the period of storage. It should be noted that the computer with which the time selection device is used is not restricted to binary numbers. Indeed, electrical signals are only one possible physical expression of the information being dealt with.

The internal serial memory comprises $\alpha$ delay lines each capable of storing $\beta$ words each represented by a group of $\gamma$ successive digits. In serial storage the sequence in which the digits appear expresses their significance. Each of the pulses representative of a binary digit propagates down the delay line with a velocity determined by the physical characteristics of said line. The length of time required for one word to pass a given point has already been referred to as a minor cycle. The minor cycle may also be defined as the time occupied by each word ($\gamma$ pulse periods). One circulation of each delay line requires $\beta$ minor cycles and during this time each word stored in the corresponding delay line appears at the output of that delay line and is available for transmission to reading and writing circuits exactly once. The memory cycle in this case is equal to the delay of the line. In order to establish a digital significance for the circulating pulse trains, a basic pulse repetition rate is established by a master clock which supplies input or reshaping pulses to all the delay lines of the memory synchronously.

If all the delay lines in the memory are synchronized, and if each is assigned a number from 0 to $\alpha$, then the number of a delay line and the number of a minor cycle together completely identify a cell or word position and constitute an address.

An address code is assigned to each of the word positions in the serial-parallel memory; the total number of such word positions is given by the product of $\alpha$ and $\beta$. Each address consists of a binary number having a certain number of digits. One group of the digits of the address specifies the number of the minor cycle 0 through $(\alpha-1)$ during which the desired word is available for transmission and is known as the word part of the address and represents a time selection. Another group of digits makes up the line part of the address and designates the number of the delay line in which the word is to be found. This portion of the address, however, is no concern of the subject invention. During some predetermined time which coincides with some fixed portion of a minor cycle, a group of pulse periods (minor cycle tag) corresponding in number to the number of digits in the time portion of the address is allotted to binary digits which indicate the number of a corresponding minor cycle. If, for example, the time portion of the addresses contains five digits, the five pulse positions would be representative of the binary number 00000. On the next minor cycle the binary number would be 00001, etc. The numbers or tags 0 through $(\alpha-1)$ are thus assigned to the successive minor cycles of every memory cycle.

The minor cycle tag is prodced by some means operating in synchronism with the memory, but not necessarily a part of the memory. If the tag is in the memory, it is not stored in that portion of the memory accessible to the time selector.

It should be noted that this invention does not require the existence of tags. It is necessary only that some method of indicating time exists.

The central control unit directs the over-all operation of the computer in accordance with orders inserted by a coder. An order is a sequence of symbols which, if correctly used, will tell the operator what the computer will do or is doing when the order is performed. The order may comprise a series of digits. The computer is able to determine whether a sequence of digits is an order or a number.

These orders each consist of words which are stored in the memory. In order to illustrate the principles involved in orders, a typical arrangement will be set forth by way of example. In one case each order consists of two words occupying two adjacent word positions in the delay line. The first word of every order contains the addresses of the two operands to be sent to the arithmetic unit and operation code which is also sent to the arithmetic unit to indicate the type of operation to be performed therein. After an interval sufficient to allow the arithmetic unit to operate the second word of the order appears. This word contains the address of the result and the address of the next order. The complete order in this case contains four addresses and an operation code and requires two minor cycles for its transmission. The order need not confrom to the above pattern and the invention is not to be so limited. For purposes of this invention any number of addresses may be present in an order and any manner of coding may be used.

In selecting the addresses of an order, the central control will deal with but one order word at a time. The selection of a given address in an order word involves the selection of the correct delay line in the memory whose number is given by one group of digits of the address and the selection of the time at which the word is available at the output of the delay line in accordance with the word number appearing at another group of digits in said address.

The circuit of applicant's invention is concerned with time selection, that is, selection of the minor cycle (designated by the address) when the memory position is available to the reading and writing circuits of the memory. In order to prevent unduly complicated and expensive inter-unit equipment, as already stated, the central control has only one bus available for transmission of information to or from the memory. For this reason, only one memory address can be read from or written into at a time. In selecting, for example, two operands in the four-address order above described, it is possible either always to select the first operand and then the second, or else always to select whichever operand appears first at the output of its own delay line. The method is used in which the first available operand is selected and transmitted to the arithmetic unit and the other operand is selected and transmitted when it is available. This method results in an increased computer operating speed. In case two operands are available simultaneously, the operand whose address appears first in the order word will be selected and the second operand will be selected $\beta$ minor cycles later when it again appears. A similar process will occur in selecting the two addresses in the second order word. Special provisions must also be made for selecting special addresses without delay.

In order to determine at what time a given address is available at the output of its delay line, the word or time part (for example, a binary number) of the addresses of the active order word is compared in an anti-coincidence circuit with the binary number or tag representative of the number of the current minor cycle. When these numbers agree, no output pulse is derived in the output of said anti-coincidence circuit. During disagreement between these numbers, however, a pulse is derived at the output of the anti-coincidence circuit. This pulse is applied to one of the input terminals of the time selector of the subject invention. As will be seen subsequently, the time selector is instrumental in allowing the passage of a word from the selected serial memory.

As will be explained later, there is usually a delay of one or more minor cycles between agreement and transmission. The tags are equal to such a number that when they agree with the address transmission will occur on the proper minor cycle.

It will be shown later that a time selector input pulse may be derived during agreement instead of during disagreement, by modifying the circuitry external to the time selector. This invention, therefore, is not to be limited to the case in which time selector pulses are derived during disagreement.

The description henceforth will be concerned with an $n$-address system irrespective of the type of order coding and method of presenting addresses for selection. The time selector of the subject invention will be assumed to be part of a central control which somehow obtains the addresses for selection and presents them to the time selector input. As previously stated, any time selector used with a serial memory must provide a means for identifying the time associated with each address. It will be assumed that this time identification is provided somehow by the control unit. The means for making this time identification is not the subject of this invention. It will also be assumed that the master clock in the central control delivers a plurality of clock pulses which are synchronized with the serial memory and whose pattern is repeated every minor cycle. These clock pulses are indicated on the drawing by capital letters and follow one another in alphabetical order.

The foregoing and other features of the invention will become more apparent from the detailed description of certain specific embodiments that follows. The description refers to the accompanying drawings, wherein:

Fig. 2 is a fragmentary block diagram of a modification of the time selector device of Fig. 1 for a different normal order of precedence;

Fig. 3 is a fragmentary block diagram of a modification of the time selector device of Fig. 2 in which time identification pulses occur during agreement between the time part of an address and a minor cycle tag, rather than for disagreement, as in the case of Fig. 1;

Fig. 4 is a block diagram of a basic time selector device in which provisions are made for dead time;

Fig. 7 is a block diagram of a three-address time selector device which is arranged to accommodate addresses which may be special as well as regular;

Fig. 8 is a block diagram of a modification of the time selector device of Fig. 7 in which only certain addresses are ever special;

Fig. 9 is a block diagram of a time selector device similar to that of Fig. 7 which involves two addresses instead of three;

Fig. 10 is a block diagram of a modification of the time selector device of Fig. 9 utilizing a different precedence group;

Fig. 11 is a block diagram of a modification of the time selector device of Fig. 9 using still another precedence group;

Fig. 12 is a circuit diagram illustrating a typical flip-flop shown in Figs. 1 to 11;

Figure 6:
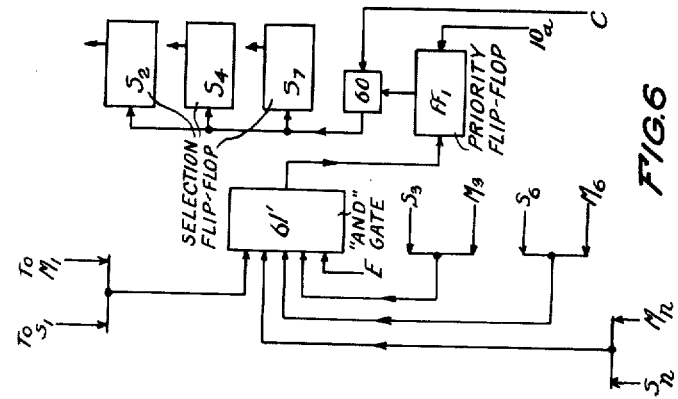
Fig. 6 is a fragmentary block diagram showing a modification of the array of Fig. 5 for a different group of primary and subsidiary addresses.
Figure 5:
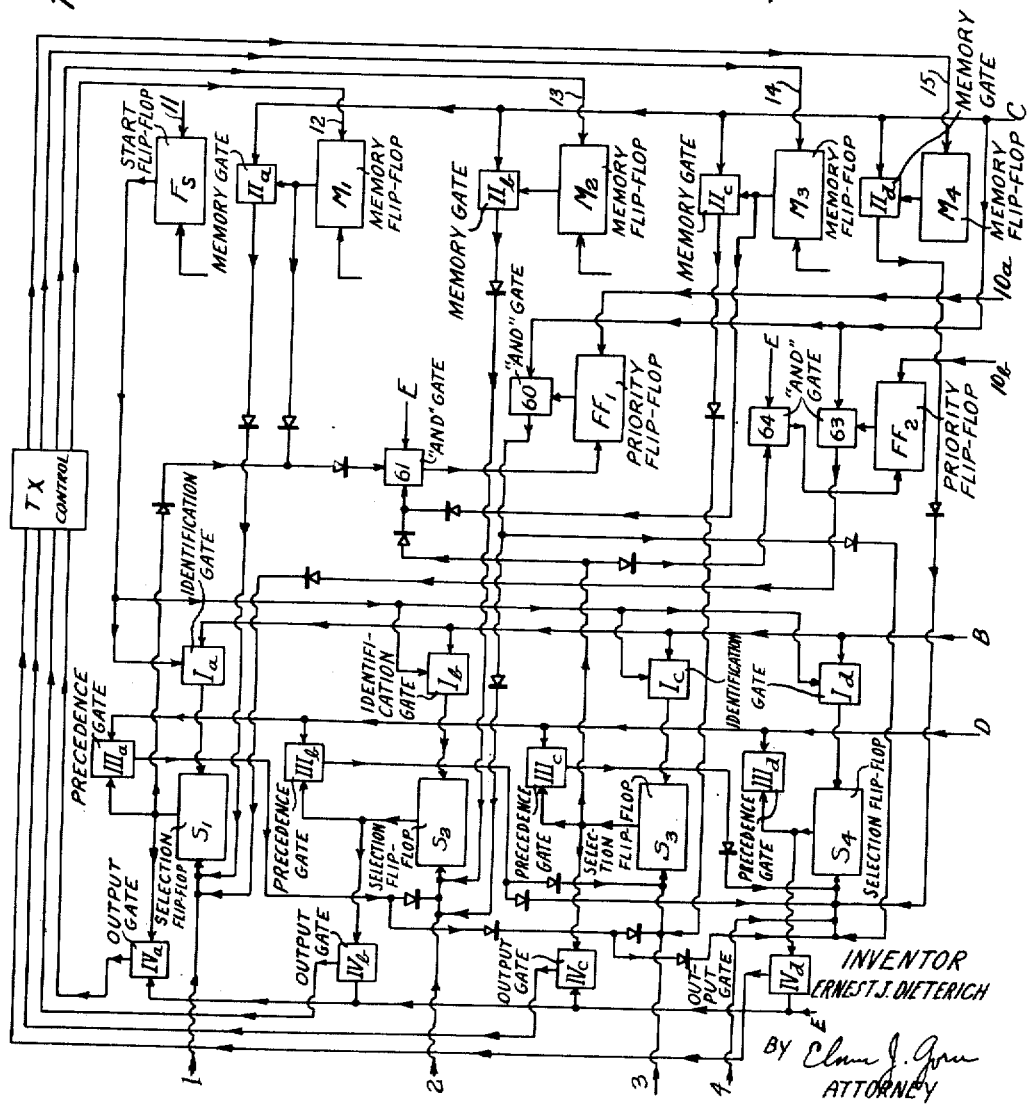
Fig. 5 is a block diagram of a time selector which is modified to permit the selection of a primary group of addresses in a fixed sequence prior to a subsidiary group of addresses, irrespective of their relative time-locations in the serial memory.

Figs. 13 to 15 are circuit diagrams of coincidence gates illustrated in the various block diagrams of Figs. 1 to 11. The gate designated as 61 in Fig. 5 is shown in Fig. 14 and the gate designated as 61' of Fig. 6 is illustrated in Fig. 15. All other gates in the block diagrams of Figs. 1 to 11 are as shown in the circuit diagram of Fig. 13, except for gate $x$ of Fig. 1, gates $V_a \ldots V_n$ of Fig. 4 and gate 74 of Figs. 7 and 10, which differ from that shown in Fig. 13 only in having one buffered input as defined in column 7.

Before proceeding with a description of Fig. 1, a definition of the term flip-flop as used in connection with elements $F_s$, $S_1 \ldots S_n$ and $M_1 \ldots M_n$ will be given. The expression flip-flop as herein used refers to any device having the following properties.

The device has two stable states and will remain in either of these states indefinitely if undisturbed. One of these states is arbitrarily called the active state and the other the inactive state. The device has two inputs, one corresponding to each of its stable states such that, upon receiving an impule on this input from another component, it will assume the corresponding state and will remain in this state, with or without further impulses on the same input, until the receipt of an impulse on the other input. Each device has an output when and only when it is in a predetermined one of said two states.

In the block diagram notation for the flip-flop the inputs thereto are brought in over lines extending from the sides of the block while the output, if any, is carried over a line extending from the top of said block. The lefthand side of the block corresponds to the reset or inactive state and is sometimes referred to as the reset side. When the flip-flop is receptive of an input on the reset side, no output is obtained from the flip-flop. The righthand side of the block corresponds to the active state or condition. An output is derived from the flip-flop only when it is in the active state.

The flip-flops $S_1 \ldots S_n$ and $M_1 \ldots M_n$ whenever shown in the various figures of the drawing, together with flip-flop $F_s$ appearing in all figures of the drawing except Fig. 4, may be a circuit such as shown in Fig. 2 on page 493 of an article entitled, "The physical realization of an electronic digital computer," by A. D. Booth appearing in the December 1950 issue of Electronic Engineering and described on pages 492 and 493, omitting the optional input to the cathode and one of the output connections.

The circuit diagram of a typical flip-flop is shown in Fig. 12 and includes a dual triode with the usual cross-coupling between the plate of one section of the triode and the grid of the other section. Separate input connections are made to the grids of the two sections of the tube whose lefthand section is normally conductive. A positive-going output pulse is derived from the plate circuit of the lefthand section when a positive-going input pulse is applied to the grid of the righthand section. The flip-flop remains in this state, known as the active state, until a positive-going input pulse is applied to the grid of the lefthand section, whereupon the latter section becomes conductive and the righthand section nonconductive; this state is referred to as the inactive state since there is no positive-going output pulse derived from the single output terminal connected to the plate of the lefthand section while the flip-flop is in this state. There is but one exception to the flip-flop arrangement shown in Fig. 12, namely, that of start flip-flop $F_s$ of Fig. 4. In this one case, there are two outputs, for reasons to be pointed out subsequently. The additional output (not shown in Fig. 12) is derived by a connection made to point $z$ in Fig. 12 so that there is a useful output derived from the righthand section of the flip-flop as well as from the lefthand section. The expressions "active state" and "inactive state" in the specification, as applied to flip-flop Fs of Fig. 4 refer, respectively, to the conditions wherein the righthand section of the dual triode receives an input signal and wherein the lefthand section of the dual triode receives an input signal.

There is but one exception to the above, namely, the arrangement of master start flip-flop Fs when used in devices requiring the establishment of dead time. This exception is illustrated in Fig. 4 in which Fs has two outputs. An output is derived on the left-hand line extending from the top of Fs whenever the latter is in the inactive state whereas an output is derived on the right-hand line extending from the top of Fs whenever the flip-flop is in the active state.

The flip-flop Fs shown in Fig. 4 of the drawing may be of the type shown in the aforesaid Electronic Engineering article omitting only the optional input to the cathode.

Although the flip-flops hereinafter described are electrical components, the invention contemplates the use of mechanical, electromechanical or any other type device having the properties above described.

In the time selection device a plurality of gates are employed and are represented in the drawings by a square containing an appropriate reference character. As is well known in the electronic art, a gate is a device having more than one input and one output and characterized in that an impulse appears at the output only if impulses appear on all inputs simultaneously. The inputs are indicated by arrowheads. The gate, as contemplated in this invention, however, need not be electrical.

The gates shown in the various figures of the drawing are current coincidence gates or "And" circuits of the type illustrated and described on page 511 of an article entitled, "Diode coincidence and mixing circuits in digital computers," by Tung Chang Chen, appearing on pages 511 to 514 of the May 1950 Proceedings of the I. R. E. or of the type illustrated in Fig. 2 on page 112 of an article by C. H. Page entitled, "Digital computer switching circuits," appearing on pages 110 to 118 of the September 1948 issue of Electronics and described in detail on pages 114 and 115.

As is well known in the art, a coincidence gate may include any number of inputs. The coincidence gate of the I. R. E. or Electronics articles has three inputs and one output just as does gate 61 in Fig. 5 of the drawing. Gates I, II, III, IV, V, $x$, $y$, 32—35, 47, 48, 60, 63, 64 and 71—77 are examples of coincidence gates of the type shown in the I. R. E. or Electronics articles with one input omitted; in other words, these gates have two inputs and one output. Likewise gate 61' in Fig. 6 of the drawing may be of a type shown in the I. R. E. and Electronics articles except for the addition of two inputs; that is, gate 61' of Fig. 6 has five inputs and one output.

Certain ones of these gates, for example gate $x$, V, 74 of Figs. 7 and 10, 61 of Fig. 5 and 61' of Fig. 6 have one or more buffered inputs. This fact, however, does not affect the basic construction of the coincidence gate. A buffered input, as referred to in this application, consists simply of a parallel connection of two or more individual sources of energy to a given input circuit of a coincidence gate. For example, in Fig. 7 gate 74 is a gate similar to that described in the above-mentioned I. R. E. and Electronics articles and has two inputs, one of which is buffered; the buffered input consists of either clock pulse "J," clock pulse "D" or both. Examples of buffers, sometimes referred to as "Or" circuits, are shown in Fig. 2 on page 112 of the aforesaid Electronics article.

The circuit diagram of a typical coincidence gate, otherwise known as an "And" gate, is shown in Fig. 13. This gate comprises two diodes 131 and 132 whose cathodes are connected, respectively, to two separate input channels. The anodes of diodes 131 and 132, are interconnected and are connected by way of a resistor 134 to a source of positive potential, shown by way of example only, as 120 volts in magnitude. An output is derived, under the circumstances explained below, from the junction of the anodes of diodes 131 and 132 and one end of resistor 134, as indicated in Fig. 13. As is well known, if the resistor 134 is large compared to the conducting resistance of a single diode, the common plate voltage will remain small unless both diodes are cut off by the simultaneous presence of two positive-going input signals to the cathodes of diodes 131 and 132. When both diodes are thus cut off, current flow through the circuit including resistor 134 and the diodes is substantially reduced and the voltage at the aforesaid junction increases; that is, a positive-going output pulse is derived from the gate. A clamping diode 135 having its cathode connected to the aforesaid junction point and its anode connected to a source of negative voltage, for example, minus ten volts, serves to maintain the voltage at the junction point constant regardless of the number of input signals available.

The "And" gate 61 of Fig. 5 is illustrated in detail in Fig. 14 and is basically similar to that shown in Fig. 13 except that three inputs, one of which is buffered, are available instead of two, as in the case of the gate of Fig. 13; consequently, an additional diode 133 is required, as well as buffer diodes 137 and 138. A bias for the buffer diodes 137 and 138 is provided by a source of negative voltage connected through resistor 139 to the junction of diodes 137 and 138 and diode 33.

The circuitry of gate 61' of Fig. 6 is illustrated in Fig. 15 and comprises four buffered inputs each similar to the single buffered input shown in Fig. 14. The letters to the left of the figure are self-explanatory and designate the inputs to gate 61'. The manner of operation of the gate of Fig. 15 is essentially the same as that of Figs. 13 and 14, except that five diodes, indicated generally by the reference numeral 130 are required because of the potential availability of five input pulses. Likewise, the number of buffer diodes as contrasted with the number in Fig. 14, is correspondingly increased.

In the drawing several unidirectional devices are shown which serve to isolate one portion of a circuit from another. Such devices are well known in the art and are indicated by the usual open triangle with a transverse bar at the vertex for indicating the direction in which energy may pass.

Figure 1:
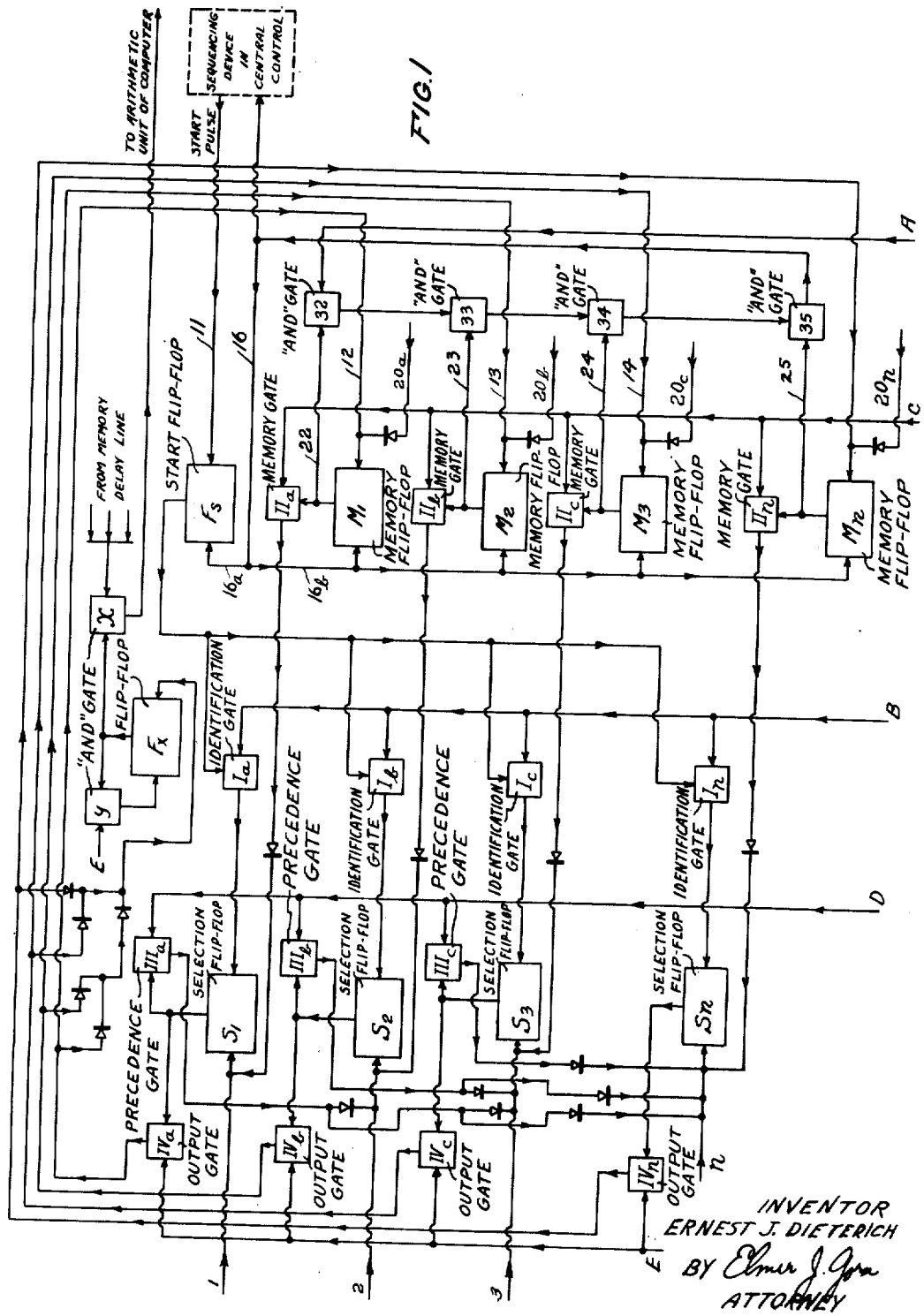
Fig. 1 is a block diagram of a basic time selector device in which all addresses are regular.

Referring now to Fig. 1, the basic time selector array for a set of $n$ addresses presented simultaneously includes a master start flip-flop Fs which must be active in order for selections to occur. This start flip-flop is activated by a starting pulse which appears on line 11 and which is derived from the central control; this master start flip-flop is activated near the beginning of the first minor cycle after the arrival of the master start pulse on line 11. Flip-flop Fs remains active until some minor cycles later when a pulse on line 16 resets it in a manner to be described later. The identification gates Iₐ, Iᵦ and so forth are opened as a result of activation of start flip-flop Fs. Lines 1, 2, 3 . . . $n$ carry the time identification pulses for the corresponding address.

Clock pulse B, which, together with input pulses 1, 2, 3 and so forth on the selector input lines, forms a time identifier for each address, appears every minor cycle. So long as gates Iₐ, Iᵦ and so forth are open, pulse B is able to pass therethrough to set (activate) selection control flip-flops S₁, S₂ . . . Sₙ. To facilitate explanation, these selection control flip-flops will henceforth be referred to simply as selection flip-flops. If we assume no agreement on this first minor cycle between the minor cycle tag and each of the time portions of the addresses, and also that a pulse is obtained corresponding to the condition of disagreement, input pulses will occur on lines 1, 2, 3 . . . $n$. Each of the input pulses renders the corresponding selection flip-flop inactive (that is, reverses the state of the flip-flop), thus indicating that selection of the associated address is not to occur. The time allotted to the input (reset) pulses lies between clock pulses B and C.

A second set of gates $II_a$, $II_b$ ... $II_n$, which may be referred to as memory gates and connected in the output circuit of associated selection memory flip-flops $M_1$, $M_2$ ... $M_n$, is opened only whenever said associated memory flip-flop is active. To facilitate explanation these selection memory flip-flops will henceforth be referred to simply as memory flip-flops. For purposes of explanation, it will be assumed that all memory flip-flops are inactive from a previous minor cycle. Gates $II_a$, $II_b$ and so forth are receptive of clock pulse C once every minor cycle. When clock pulse C arrives, however, it finds gates II closed and is ineffective. It is thus evident that pulse C has no effect if no address has previously been selected.

A clock pulse D follows pulse C and senses a set of precedence gates $III_a$, $III_b$, and so forth, connected to the output circuit of corresponding selection flip-flops $S_1$, $S_2$ ... $S_n$. Precedence gates III are open in case the corresponding selection flip-flop is active. Since none of these selection flip-flops are active, gates III are all closed and clock pulse D is ineffective.

A set of output gates $IV_a$, $IV_b$, and so forth, constitutes an output for the corresponding selection flip-flops $S_1$, $S_2$, and so forth. One of these gates is open whenever its corresponding selection flip-flop is active.

Clock pulse E, which occurs at the end of the minor cycle and sometime after the delivery of precedence pulse D, is connected to each of the output gates IV. Actually, clock pulse E must so occur that, when applied to a flip-flop, that flip-flop will change its state between the last pulse of one minor cycle and the first pulse of the next minor cycle. The outputs, if any, of these output gates may go to transmission control devices which govern the reading out of information from the serial memory. Although the transmission control circuitry is not a part of the invention, a typical example will be given of the manner in which the fact that a particular selection flip-flop is active at a certain time in the minor cycle controls the transmission of information. Specifically, the output, if any, from the gates IV may be applied through appropriate unidirectional devices to the right-hand side of a flip-flop $F_x$. $F_x$ is rendered active and supplies energy to one side of a gate $x$. The other input to gate $x$ is derived from the paralleled outputs of the various memory delay lines. When $F_x$ is activated, therefore, gate $x$ is opened and a word from an appropriate delay line is read out and transferred to the arithmetic unit of the computer. When the set pulse is applied to the right-hand side of flip-flop $F_x$, an interval of at least one-half pulse time is required for the flip-flop to change over to the active state. Clock pulse E of the given minor cycle will not open gate $y$ connected to the output of flip-flop $F_x$ in time to allow E to pass to the reset side of $F_x$. Note that the pulses are narrow in comparison with the pulse time. On the next occurrence of a clock pulse E (one minor cycle later), this new pulse E will pass through gate $y$ since $F_x$ will by this time have changed state and an output therefrom will have hit gate $y$. This new pulse E, consequently, will reset $F_x$. If pulse E should pass through one of the gates IV on this latest minor cycle due to an agreement, it will hit the right-hand side of $F_x$ as well as gate $y$ and gate $x$ will still remain open. This is accomplished by means of a flip-flop which, when simultaneously presented with a set and a reset input, will respond only to the former. It is possible, and often practical, to utilize more than one flip-flop corresponding to $F_x$.

With the arrangement just specified, the minor cycle tags are one minor cycle advanced; that is, agreement of an address with a tag will result in transmission on the next following minor cycle.

In one embodiment, a delay of two minor cycles may occur between agreement and transmission, so that the tags are two minor cycles in advance. In other possible embodiments, any number of minor cycles of delay may occur.

The outputs from gates IV also serve to reset the associated memory flip-flops. The method shown here for resetting the memory flip-flops is only illustrative and is not a part of the invention.

Since all the output gates are closed there is no transmission. So long as there are succeeding minor cycles of no agreement, clock pulse E finds all output gates closed and the cycle previously described is repetitive.

On some subsequent minor cycle, agreement will occur between the minor cycle tag pulses and the time portion of the first address. Clock pulse B arrives and passes through open gates $I_a$, $I_b$, and so on, and activates the selection flip-flop $S_1$, $S_2$, and so on. Because of the aforesaid agreement there will be no pulse on line 1 and selection flip-flop $S_1$ will remain active. Disagreement pulses appear in succession at lines 2, 3 ... $n$ and selection flip-flops $S_2$, $S_3$ ... $S_n$ revert to the inactive state, as before. Clock pulse C is ineffectual since all of the memory flip-flops are still inactive and gates II are thus closed. Because of the activity of selection flip-flop $S_1$ the output therefrom opens precedence gate $III_a$ associated therewith and clock pulse D upon its arrival passes gate $III_a$ and is applied to the reset side of all other selection flip-flops. Pulse D, in this case, is ineffective, however, since the selection flip-flops are already reset. Clock pulse E next arrives and this time finds gates $IV_a$ open. Pulse E therefore passes through output gate $IV_a$ and energizes the transmission control circuit corresponding to address 1, and including flip-flop $F_x$, gate $x$ and the appropriate delay line containing address 1. Pulse E is also applied to the right-hand (set) side of memory flip-flop $M_1$ over line 12.

It will be assumed that there is still disagreement on all lines 1, 2 ... $n$ on the next minor cycle. There must be disagreement on address 1 since there was agreement on the prior minor cycle.

The activation of memory flip-flop $M_1$ causes associated gate $II_a$ to be opened. Line 22 becomes hot and an external gate 32, which is receptive of an input clock pulse A occurring near the beginning of the minor cycle, is opened. Pulse B sets all the selection flip-flops. If there is no agreement on this minor cycle pulses 1 ... $n$ will reset the selection flip-flops once more. Although clock pulse C finds gate $II_a$ open and passes through, it is ineffective since selection flip-flop $S_1$ is already reset, like all the other flip-flops $S_2$ ... $S_N$. There is, therefore, no transmission during this minor cycle.

So long as there is disagreement on all lines 1, 2 ... $n$, the selection flip-flops will become active at the time of arrival of pulse B and will revert to the inactive state at the time of arrival of pulses 1, 2 ... $n$. This continues until an agreement occurs between the minor cycle tag and the second address. It should be noted, of course, that such agreement may occur on the minor cycle just described.

When agreement between the clock and the second address occurs, the following events take place.

Pulse B passes gates I and renders active selection flip-flops $S_1$ to $S_n$. Flip-flops $S_1$, $S_3$ ... $S_n$ are reset by pulses appearing on lines 1, 3 ... $n$. No reset pulse is present on line 2, however, and selection flip-flop $S_2$ remains active. When clock pulse E of this minor cycle arrives it passes output gate $IV_b$ which was previously opened as a result of the fact that $S_2$ stayed active. Transmission of pulse E to the transmission control corresponding to address 2 thus occurs.

At the end of the present minor cycle pulse E occurs on line 13 as a result of the selection of address 2. Memory flip-flop $M_2$ is thus set and line 23 becomes energized and gate 33 is opened. The above process is repeated when agreement between the clock and subsequent addresses occurs until each of the addresses have been selected and all the memory flip-flops $M_3 \ldots M_n$ have been activated or set. When the last address $n$ has been selected and all the memory flip-flops have been set, every one of the output lines 12, 13, 14 . . . and 22, 23 . . . 25 will be energized and consequently serially connected gates 32, 33 . . . will permit the passage of clock pulse A to reset master start flip-flop $F_s$ over line 16a and to reset all memory flip-flops over line 16b.

It should be noted that in the description so far it has been assumed that addresses 1, 2, 3 . . . $n$ have been available one at a time in that order. So long as addresses 1, 2, 3 . . . $n$ are available singly it is immaterial in what time sequence they may appear. If there were four addresses occurring in the order 4, 3, 1, 2, for example, the addresses would be selected in that order.

If, however, two or more addresses agree in their time parts simultaneously, that is, if a condition of interference exists, the precedence gates III come into play and determine which one of the simultaneously addresses shall be given precedence of selection. The expression "precedence," as used throughout the specification, refers to the order of precedence of addresses available for selection at the same time. It is also necessary that the next time simultaneous agreement occurs for two or more addresses, the addresses previously selected be ignored in favor of the one or ones previously passed over. The set of gates II associated with the memory flip-flop accomplishes this function.

Although it is theoretically possible that all $n$ addresses agree in their time parts simultaneously, it will be assumed, for the sake of simplicity of explanation, that two and only two addresses, that is, addresses 1 and 2, interfere. As in the normal case, a start pulse occurs and activates master start flip-flop. Gates I are opened by the output of flip-flop $F_s$ and allow clock pulse B to pass and set the selection flip-flops $S_1$. . . . Simultaneously agreement occurs between addresses 1 and 2 so that no pulses are present on lines 1 and 2. Selection flip-flops thus remain active and gates $III_a$ and $III_b$ are open. The selection flip-flop corresponding to every address which takes precedence over any other address controls a precedence gate III . . . whose output resets the selection flip-flops of all addresses over which the given address takes precedence. The inputs to these precedence controlling gates are clock pulses D which pass through open gates $III_a$ and $III_b$. The output of gate $III_a$ is applied to the reset side of selection flip-flops $S_2$, $S_3$ . . . which correspond to addresses of lower order of precedence than address 1. Similarly the output of gate $III_b$ serves to reset selection flip-flops $S_3$ . . . etc.

At the time of arrival of clock pulse E, selection flip-flop $S_2$ has been reset by clock pulse D so that output gate $IV_b$ is inactive. Pulse E thus passes through gate $IV_a$ only and address 1 only is selected.

As a result of the selection of address 1, a pulse is derived on line 12 which sets memory flip-flop $M_1$. $M_1$ remains active until reset by a pulse occurring after all addresses have been selected, which may be several minor cycles later. Since there was no transmission of clock pulse E through output gate $IV_b$ corresponding to address 2, there is no pulse present on line 13 to activate memory flip-flop $M_2$ and permit clock pulse C to reset $S_2$.

On the next memory cycle, double agreement again occurs. The master start flip-flop is still active, not having been reset by a pulse on line 16a, so that gates I . . . are opened. Clock pulse B makes all selection flip-flops active. Since there is a "no pulse" at lines 1 and 2, selection flip-flops $S_1$ and $S_2$ remain active. The remaining selection flip-flops are reset by pulses at lines 3 . . . $n$. Since memory flip-flop $M_1$ is in the active state, gate $II_a$ associated therewith is open. Since there is no interference other than between addresses 1 and 2, the other memory flip-flops, except $M_2$, are active so that their associated gates $II_b$, $II_c$ . . . are open. Clock pulse C passes gate $II_a$ and resets $S_1$. Clock pulse C passes gates $II_c$ . . . $II_n$ but is ineffective since the corresponding selection flip-flops have already been reset. Since $S_1$ is now inactive, gate $III_a$ is closed and clock pulse D cannot pass to reset $S_2$ . . . $n$. Since $S_2$ is active, gate $IV_b$ in the output circuit thereof is open. Clock pulse E passes through open gate $IV_b$ to allow address 2 to be selected. A pulse is derived on line 13 as a result of the selection of address 2 which activates memory flip-flop $M_2$. Gate $II_b$ is opened and selection flip-flop $S_2$ is reset.

It is evident, therefore, that during interference between addresses 1 and 2, address 1 is given precedence over address 2; the latter is not selected until it recurs on the following memory cycle. This precedence of address 1 over address 2 is achieved by means of precedence gates III. The output of precedence gate $III_a$ corresponding to address 1 is connected to the reset sides of all selection flip-flop corresponding to addresses over which address 1 has precedence. In the case just described, the output of precedence gate $III_a$ will reset selection flip-flop $S_2$ corresponding to address 2 since address 1 has precedence over address 2.

If it is desired to select address 2 first rather than address 1 in the case of simultaneously appearing addresses, the circuit of Fig. 1 may be altered as shown in Fig. 2. It will be noted in Fig. 1 that the function of gate $III_a$ is to inactivate or reset the particular selection flip-flop $S_2$ associated with address 2 over which transmission is to be barred during the first memory cycle of double agreement. If address 2 is to have precedence over address 1, however, the output from gate $III_b$ would obviously be connected to the reset side of selection flip-flop $S_1$ and the output from gate $III_a$ would be disconnected from the reset side of $S_2$ so that the gate III serves to inactivate $S_1$ rather than $S_2$, as in the preceding case.

From Fig. 1 it is also evident that gates II inactivate the selection flip-flop associated with the first address selected during the minor cycle in the next memory cycle in which double agreement again occurs. In the case where address 2 is to have precedence over address 1 (see Fig. 2), it is necessary that the proper gate II inactivate or reset $S_2$ rather than $S_1$, as in the case previously described. This function is accomplished without changes in the circuit of Fig. 1. If, however, only two addresses are ever involved, a single gate II may be made responsive to the memory flip-flop $M_1$ corresponding to the address having precedence (address 1) and may have its output connected to reset only that selection flip-flop $S_1$ corresponding to the preferred address. Now, if address 2 were to be given precedence, gate II would have to be made responsive to the memory flip-flop $M_2$ corresponding to address 2 and its output would have to be connected to the selection flip-flop $S_2$ corresponding to address 2.

With the connections as shown in Fig. 1, the order of precedence of addresses is seen to be 1, 2, 3 . . .$n$. The output of each gate III connects to the reset side of all subsequent selection flip-flops. Since address $n$ is the last one to be selected there need be no output from gate $III_n$ and, therefore, no such gate is provided in Fig. 1.

The selection of the remaining addresses 3 . . . $n$ has not been described in detail in view of the discussion already presented.

As previously stated, it is possible to operate on the basis of pulses occurring on lines 1 through $n$ only during agreement, rather than during disagreement. This may be achieved by comparing the time portion of the address and the tag representative of the number of the current minor cycle in a coincidence circuit, rather than in the anti-coincidence circuit previously referred to. In this case no clock pulse B is necessary and lines 1, 2 . . . $n$ may be connected directly to gates I . . . This modification is shown in Fig. 3. It has been found, however, that circuits are more readily realizable in practice which produce pulses during disagreement between the time part of the address and the minor cycle tag.

In the description of the circuit of Figs. 1 to 3, it was assumed that agreement (either single or simultaneous) would occur on minor cycles which are not adjacent; in other words, the assumption was made that an interval of at least one minor cycle occurred between the time that agreement existed for address 1 and the time that agreement existed for address 2, and so forth.

It is possible, however, that agreement may occur on adjacent minor cycles. As previously mentioned, the computer of which the time selector is a part must take into account information which is a function of space as well as of time. The spatial selection circuits in the central control, for reasons which need not be considered in detail here, are slow acting and require approximately one minor cycle to operate. Furthermore, for reasons of economy and simplicity in construction of the computer, only one transmission bus is used for both spatial and time selections. In such cases, it becomes necessary to inhibit the selection on successive minor cycles in the event that agreement should occur on two adjacent minor cycles.

To prevent the transmission of the first address, corresponding to a given minor cycle in which agreement occurs, on the same minor cycle as the selection of the address corresponding to the adjacent minor cycle on which agreement again occurs, and to insure at least one minor cycle waiting period or dead time between the establishment of agreement for one address and transmission through the associated transmission control circuit for said address, the circuit of Fig. 4 is devised.

The elements of Fig. 4 corresponding to those of Fig. 1 are shown by the same reference characters. For purposes of explanation, it will be assumed that agreement occurs for address 1 on the first minor cycle and agreement for address 3 occurs on the next minor cycle and that there is no interference. In Fig. 4 a series of gates V are connected in the time selector input line 1, 2 . . . n. Upon the arrival of a start pulse on line 11, start flip-flop $F_s$ will become active and an output will appear on line 40 leading to gates $I_a$ and $I_b$ and on lines 40a, 40b, and so forth, each of which serves as one input to gates V. Clock pulse B activates selection flip-flop $S_1$ . . . $S_n$. Pulses appearing on all input lines except line 1 reset $S_2$ . . . $S_n$ by way of gates $V_b$ . . . $V_n$. Selection flip-flop $S_1$ is left active because of agreement for address 1. Clock pulse D which passes open gate IIIa is ineffective since flip-flops $S_2$ . . . $S_n$ are already reset. Clock pulse E is applied to a pair of gates 47 and 48. Gate 47 is also connected by way of line 41 to the left-hand or reset side of start flip-flop $F_s$, while gate 48 is connected by way of line 40' to the right-hand or set side of start flip-flop $F_s$. Since the start flip-flop is active, gate 47 is closed and pulse E cannot pass through to hit output gates IV. During this time only output gate IVa is open since $S_1$ is the only active selection flip-flop; but, as just mentioned, there is no pulse to pass the open gate.

A second set of gates VI is energized by the output of a corresponding selection flip-flop and by the output, if any, from gate 48 which appears on lines 42, 42a, 42b and so forth. Since start flip-flop $F_s$ is active, gate 48 is open. Since $S_1$ is active, gate VIa also is open. At E time, pulse E passes open gate 48 and hits open gates VI, only one of which, namely, gate VIa, is open. Pulse E passes gate VIa, and it is also carried on line 17 to the reset side of start flip-flop $F_s$, thereby resetting it. During the minor cycle just described, therefore, there is no transmission through any of output gates IV.

On the next minor cycle $F_s$ is now inactive so that gates I and V are all closed. Because of the resetting of $F_s$, gates I are closed so that clock pulse B is unable to set any selection flip-flops. There is now a disagreement pulse on line 1, since there was agreement for address 1 on the previous minor cycle. However, because gate $V_a$ is now closed, the disagreement pulse on line 1 cannot reset $S_1$ and the latter remains active during this minor cycle as well. Since the left-hand side of $F_s$ is now active, gate 47 is opened. When pulse E now arrives, it passes gate 47 and hits output gates IV. Since gate IVa is still open, pulse E passes it and sets (activates) $F_s$, as well as memory flip-flop $M_1$ and flip-flop $F_x$. After $F_x$ has changed state, which will be some time after the last occurring clock pulse, E has disappeared, gate Y, which is connected to the output of the right-hand side of $F_x$, will be opened. On the following minor cycle, clock pulse E will pass gate Y and will reset $F_x$.

Suppose now that agreement for address 3 occurs on the minor cycle following agreement for address 1, that is, during the dead time. Start flip-flop $F_s$ is in the reset state because of the dead time and, hence, no address may be selected, even though agreement actually occurs. On the following memory cycle, when agreement again occurs for address 1, memory flip-flop $M_1$ is active, gate IIa is open and selection flip-flop $S_1$ is reset. Consequently, when clock pulse E, which occurs at the division of two minor cycles, arrives, gate VIa is closed and $F_s$ is not reset. On the next minor cycle, $F_s$ is active and address 3 is selected normally.

Summarizing the above remarks, it is evident that transmission can never occur during the dead time, which, in the particular embodiment of Fig. 4, is one minor cycle in duration. When agreement occurs for an address during dead time, the inhibited address is selected, not on the following minor cycle, but rather on the following memory or major cycle.

Suppose now that agreement should occur for address 3 on the minor cycle during which transmission of address 1 occurs, $F_s$ would be active and gates V open. Clock pulse B would activate $S_1$ . . . $S_n$, as before. Pulses appearing on all input lines except line 3 would reset all selection flip-flops other than $S_3$ assuming there is no interference. $S_3$ would remain active. Clock pulse E would arrive at gates 47 and 48, passing open gate 48 and gate VIc and resetting $F_s$. At the same time, E passes gate y and resets $F_x$. On the following minor cycle, that is, on the minor cycle following address 1, the next clock pulse E would pass open gate 47 and output gate IVc. Transmitted pulse E would then set $F_s$, $M_3$ and $F_x$. $F_x$ remains active for one minor cycle, permitting the transmission of the contents of the memory cell designated by address 3. It should be noted that, prior to the arrival of the master start pulse on line 11, gate 48 is open and transmits clock pulse E each minor cycle; all gates VI, however, are closed.

If agreement should occur for any of the other addresses, either on the minor cycle adjacent to and following the minor cycle in which transmission occurs or on any other subsequent minor cycle, normal operation as described in connection with addresses 1 and 3 will be resumed.

From the above discussion, it is evident that, once an address is selected on a given minor cycle, no address can possibly be selected on the next minor cycle. Furthermore, the dead time, that is, the time during which address selection is prohibited in the event of agreement on two adjacent minor cycles, is equal to one minor cycle. By utilizing a dead time of but one minor cycle, a minimum delay in selection is achieved consistent with the above-mentioned inhibition.

The basic array of Fig. 1 may be modified to provide for the possibility of presenting less than the full number of addresses on any occasion. In order to skip a certain address, should said address be presented for selection, the time selector acts as though said address had already been selected. If an address is to be ignored temporarily, the memory flip-flop associated with the address to be ignored (void address) receives a set pulse from a portion of the computer external to the time selector device before the master start flip-flop is set. The corresponding gate II is thereby opened so that when the next clock pulse C appears it passes said corresponding gate II and resets the selection flip-flop corresponding to said void address.

Specifically, if address 3 is to be ignored, a control input pulse appears on line 20c and sets the memory flip-flop $M_3$ associated with address 3. Gate $II_c$ is opened as a result of the activation of $M_3$. When clock pulse C arrives, it passes gate $II_c$ and resets selection flip-flop $S_3$, thus preventing output gate $IV_c$ from passing clock pulse E.

The number of control input lines 20 receptive of control pulses depends upon the number of void addresses. The apparatus for delivering the control pulses, and for detecting that some address or addresses are to be presented on a certain occasion, is not a part of the subject invention.

In many instances it is desirable to establish priority among addresses regardless of the time at which a particular address or addresses arrive in relation to other addresses. This is not strictly a selection independent of time, however, since selection is dependent upon agreement as indicated by the time identifier.

A typical auxiliary array which, when added to the basic array, already described in Fig. 1, provides for the selection of an address or group of addresses in a fixed or partially fixed sequence whatever their relative time-locations in the serial memory is shown in Fig. 5, for a group of four addresses, two of which are to be selected prior to another set of two addresses.

In order to clarify the description, the group of addresses which is to have priority will be referred to as the preferred group and the addresses contained in this group will be termed preferred addresses. Similarly, the group of addresses over which the preferred group has priority will be referred to as a subordinate group while the addresses included in this group will be termed subordinate addresses.

The portion of the selector common to both Fig. 1 and Fig. 4 is indicated by the same reference characters. The auxiliary array shown in solid lines in Fig. 5 for permitting selection of a preferred group of addresses prior to selection of a subordinate group of addresses includes a priority flip-flop $FF_1$ for each group of addresses (1 and 3) which must be selected prior to the selection of another group of addresses (2 and 4).

Whenever the computer determines (in a manner which is of no concern in this application) that a fixed sequence is to be observed, a control input pulse 10a is applied to auxiliary (priority) flip-flop $FF_1$ to activate it and open gate 60. A second control pulse 10b, which may or may not occur simultaneously with pulse 10a, is used in a manner to be described later. Control pulses 10a and 10b occur prior to the arrival of master start pulse 11 and, like the latter, do not re-occur until all addresses have been selected.

Clock pulse C is applied to gate 60 immediately after time identification. The output of the gate associated with $FF_1$ resets all selection flip-flops corresponding to addresses not to be selected until after the selection of the addresses or group of addresses corresponding to the given flip-flop. For example, clock pulse C passes gate 60 whenever $FF_1$ is activated by control pulse 10a and resets the selection flip-flop $S_2$ and $S_4$ corresponding to subordinate addresses 2 and 4 over which the preferred group of addresses, including addresses 1 and 3, has priority.

An inspection of the precedence gate circuitry will indicate that the normal sequence of selection, that is, the sequence of selection obtainable in the absence of control pulses 10a or 10b, is identical to that obtained by the circuit of Fig. 1. In other words, the addresses will be selected in whatever order they become available except where interference occurs, in which case the order to be observed is predetermined and may be 1, 2, 3, ... n.

The reset pulse for each flip-flop in the auxiliary array (in this case only one) comes from a gate 61 having a number of inputs $k+1$ where $k$ is the number of addresses in the preferred group. The additional input to gate 61 is clock pulse E. Gate 61 is so constructed in the circuit of Fig. 5 that it produces an output only when all inputs are active simultaneously. Pulse E on gate 61 is required whenever the computer generates pulses on the time selector input lines indicative of disagreement between the time portion of the address and the minor cycle tag. Clock pulse E is necessary because clock pulse B appearing prior to pulse E activates selection flip-flops at time B which is too early in the minor cycle to determine which addresses are available for selection. If there were no clock pulse E applied to gate 61, as soon as B time arrived on the minor cycle following the activation of the memory flip-flop corresponding to the next to last preferred address to be selected, gate 61 would allow reset of $FF_1$ and prevent reset pulses from passing gate 60 to the selection flip-flops of the subsidiary group. However, it is necessary that $FF_1$ not be reset until agreement actually occurs for the last address in the preferred group.

If the time selector is such that an input pulse is obtained on agreement instead of on disagreement, as in the circuit of Fig. 2, there are no clock pulses B present. There still exists a need for clock pulse E to be applied to gate 61, however. Should agreement for addresses 1 and 3 in the circuit of Fig. 5 occur simultaneously, gate 61, in the absence of an input pulse E from the clock, would immediately be receptive of energy from both $S_1$ and $S_3$ and flip-flop $FF_1$ would be reset before precedence pulse D arrived. To prevent premature resetting of $FF_1$ before both of addresses 1 and 3 have been transmitted, it is necessary to apply a clock pulse to gate 61 which arrives subsequent to pulse D.

Since the preferred group, in the example described in Fig. 5, contains two addresses, 1 and 3, there will be three inputs to gate 61. Each of the $k$ inputs consists of the output of the selection flip-flop corresponding to one of the addresses in the preferred group and the output of the associated memory flip-flop, buffered together through appropriate unidirectional devices which serve to prevent the outputs from the selection flip-flops and the corresponding memory flip-flops from directly affecting elements of the circuit other than gate 61. The term "buffered" henceforth refers to the parallel arrangement of two input pulse sources, viz., a selection flip-flop and its corresponding memory flip-flop, and including unidirectional energy transfer devices for preventing undesired interaction of said sources. For example, in the case just given, the output of $S_1$ corresponding to address 1 of the preferred group and the output of associated memory flip-flop $M_1$ are buffered and applied to one input of gate 61. Likewise, the output of $S_3$ corresponding to the other address of the preferred group and the output of its associated memory flip-flop $M_3$ comprise a second buffered input to gate 61. The third input to gate 61 is clock pulse E. When all inputs to gate 61 are active simultaneously an output is obtained.

If the first address in the subsidiary group is not available for selection on the minor cycle immediately after the minor cycle in which the last address in the preferred group is available for selection, said subsidiary address will be selected whenever it does become available, whether or not buffered inputs to gates 61 are used. In this case, gate 61 need be energized only by outputs from the memory flip-flops of the preferred group. If, however, one of the addresses in the subsidiary group is available for selection on the minor cycle immediately following the minor cycle in which availability occurs for the last address in the third group, a whole memory cycle would be lost before said subsidiary address could be selected in the event that gate 61 were fed only from the memory flip-flops. If there are $n$ minor cycles in the memory cycle there is one chance in $n$ of losing one entire memory cycle in the absence of buffering.

In this case it is necessary that the outputs of selection flip-flops corresponding to the preferred group of addresses be buffered to the outputs of the associated memory flip-flop prior to application to gate 61.

Although the gating arrangement 61 thus far described includes a series of buffered inputs and a sensing pulse in the form of a clock pulse E, the invention is not limited thereto. For example, the sensing pulse for gate 61 may be delayed after pulse time E until after the memory flip-flop corresponding to the last address of the preferred group of addresses actually selected has been set, provided clock pulse C from the minor cycle has not yet arrived. In other words, the sensing pulse for gate 61 may arrive at any time between the setting of the aforesaid memory flip-flop and the arrival of the next clock pulse C.

Assuming the absence of a control input pulse 10b and a consequent inactivity of flip-flop $FF_2$, the master start pulse 11 arrives after control pulse 10a, thereby activating start flip-flop $F_s$ and opening gates I. Clock pulse B activates or sets selection flip-flops $S_1$ to $S_4$. However, as previously stated, clock pulse C, in passing open gate 60, resets (inactivates) selection flip-flops $S_2$ and $S_4$. It is evident that, should agreement occur first for either of subsidiary addresses 2 and 4, they would not be selected because of the inactivity of $S_2$ or $S_4$, as the case may be, and its associated output gate IV. If, however, agreement occurs first for either adress 1 or 3, $S_1$ or $S_3$, as the case may be, will be activated and transmission of clock pulse E through its associated output gate IV will occur. If agreement comes for only subordinate addresses before agreement for both of addresses 1 and 3, the subordinate address will still be barred since $FF_1$ is still active. After all preferred addresses (1 and 3) have been selected, gate 61 has received input pulses on two of the three inputs and is open. At the end of the minor cycle clock pulse E passes through gate 61 and resets $FF_1$. Selection of addresses 2 and 4 now proceeds in the normal manner. If agreement occurs for addresses 1 or 3 the corresponding selection flip-flop will be reset because these addresses have already been selected. The associated memory flip-flop $M_1$ or $M_3$, as the case may be, is now active, owing to the previous selection of address 1 or 3, as the case may be, and clock pulse C passes the associated gate II to reset the corresponding selection flip-flop. Thus subsequent transmission of clock pulse E through the corresponding output gate IV is prevented.

Summarizing, whenever a control pulse appears on input line 10a at the beginning of time selection, regardless of the time at which the addresses are available for selection, the subordinate addresses 2 and 4 will not be selected until both of preferred addresses 1 and 3 of the preferred group are selected. This is achieved basically by resetting the priority (auxiliary) flip-flop $FF_1$ as soon as all addresses in the preferred group are selected.

From the above discussion it is possible to devise any number of variations of the array of Fig. 5, depending upon the addresses comprising the preferred and subordinate groups.

In Fig. 6 a modification of the array of Fig. 5 is shown for the case of a preferred group of addresses comprising addresses 1, 3, 6, and $n$ and a subordinate group of addresses comprising addresses 2, 4, and 7. In other words, addresses 1, 3, 6, and $n$ are all to be selected prior to selection of addresses 2, 4, and 7. It is to be understood, of course, that addresses 5 and 8 . . . ($n-1$) may be selected in the sequence typical of the basic array of Fig. 1, i. e., in the order of availability in the absence of interference or in a predetermined sequence should interference occur.

Gate 61' is receptive of a clock pulse E. In addition the outputs of the selection flip-flop $S_1$ and of associated memory flip-flop $M_1$ corresponding to address 1 are buffered together and connected to one input circuit of gate 61'. Similarly, the buffered outputs of the selection flip-flop and the associated memory flip-flop for addresses 3, 6, and $n$ are connected to other input circuits of gate 61', as shown schematically in Fig. 6. When all input circuits are active, an output is derived from gate 61' and is connected to the reset side of priority flip-flop $F_1$. Gate 60 is receptive of input pulses from the right-hand side of flip-flop $FF_1$ and clock pulses C from the master clock. Until such time as all of preferred addresses 1, 3, 6, and $n$ are selected, $FF_1$ is active, gate 60 is open and clock pulse C passes through to reset the flip-flops $S_2$, $S_4$, and $S_7$ corresponding to the subsidiary addresses. In this way selection of addresses 2, 4, and 7 is inhibited until all of the preferred addresses are selected. When $FF_1$ is reset as a result of prior selection of all of preferred addresses 1, 3, 6, and $n$, gate 60 is closed and the inhibiting reset pulses are no longer applied to selection flip-flops $S_2$, $S_4$, and $S_7$.

Referring once more to Fig. 5, it is now evident that, if there is only one address in the preferred group, only two inputs would be applied to gate 61. The output of the associated memory flip-flop need not be buffered to the ouput of the selection flip-flop since there is only one address involved in the preferred group. An example of this is shown for the case in which, as between addresses 1 and 3 of the previously discussed preferred group of addresses 1 and 3, address 3 be given priority over address 1. This is equivalent to a new priority relationship in which a single address, that is, address 3, comprises the preferred group and a single address, namely, address 1, comprises the subsidiary group. The output of the selection flip-flop $S_3$ is applied to multiple gate 64 (corresponding to the gate 61 previously described) and is the only input to gate 64 other than clock pulse E. The output of gate 64 is connected to the reset side of priority flip-flop $FF_2$. The latter is set by an input control pulse 10b which may or may not occur simultaneously with control pulse 10a, but which must occur prior to master start pulse 11. When control pulse 10b arrives, $FF_2$ is activated and gate 63 associated therewith is opened. Until address 3 in the preference group of one address is selected, pulse E is unable to pass gate 64 to reset $FF_2$ and the latter remains active. Gate 63 associated with $FF_2$, therefore, is open and clock pulse C is able to pass through and reset the selection flip-flop $S_1$ corresponding to the sole address of the subsidiary group. In this way, selection of subsidiary address 1 is inhibited until preferred address 3 has been selected. When address 3 has been selected, gate 64 becomes open and clock pulse E is able to reset $FF_2$. Gate 63 is then closed and clock pulse C is no longer able to reset selection flip-flop $S_2$; inhibition on the selection of address 1 is thus removed.

By combining the sets of auxiliary (priority) flip-flops $FF_1$ and $FF_2$ and their associated gates 60, 61 and 63, 64, respectively, it is evidently possible not only to select addresses 1 and 3 prior to addresses 2 and 4, but also to select address 3 prior to address 1. Flip-flops $FF_1$ and $FF_2$, although both are included in the circuit of Fig. 5, act independently. Either one or neither may be set separately by corresponding control pulses 10a or 10b, or both may be active simultaneously if both pulses 10a and 10b are present. If both control pulses are present the effect obviously is to establish a rule of priority such that address 3 is selected before 1 and both 3 and 1 before 2 and 4. The addresses 2 and 4 may be selected in either sequence. These addresses are selected in the above order regardless of their relative time-locations in the serial memory. If neither of control pulses 10a and 10b are present, the basic array of Fig. 1 obviously obtains.

In some instances at least one address must be selected independently of time, that is, independent of whether or not there is agreement as per the time identifier. Such addresses are known as special addresses. In order to select an address or addresses regardless of the time identifier indication, and auxiliary array is utilized which consists of a set of auxiliary flip-flops and associated identification gates controlled thereby, one of each address which may, at some time, be special. Also included in the auxiliary array is a set of precedence gates which replace and supplement the precedence gates of the basic array of Fig. 1.

The auxiliary precedence gates are connected to the selection flip-flops of the basic array and cooperate with the precedence gates of the basic array to establish the rule of precedence when one or more special addresses are selected. The number of precedence gates in the auxiliary array depends upon the complexity of the rule of precedence for special addresses. If the rule of precedence is never altered by having special addresses, obviously no precedence gates are required in addition to those of the basic array.

The identification gates, as well as the auxiliary precedence gates, are receptive of clock pulses from the master clock. Each flip-flop of the auxiliary array is set prior to the setting of the master start flip-flop $F_s$ on every occasion when the corresponding address is to be selected independent of time.

A rule of precedence may be defined formally as a set of ordered pairs of addresses, each pair being characterized in that the first element of said pair has precedence over the second element of said pair. If there are $n$ addresses involved, the precedence rule comprises a set of $$n\frac{n-1}{2}$$

pairs of addresses. From a physical standpoint, a rule of precedence is a rule which determines, in case of interference between two addresses in a given minor cycle, which one of them is to be selected in said given minor cycle.

The rules of precedence are arbitrary and are selected by the designer of the computer in advance; these rules are governed by considerations external to the design of the time selector device.

The concept of precedence rules may be illustrated by reference to Table I given below.

*Table I*

| Addresses | | | Order of Precedence | | |
|---|---|---|---|---|---|
| 1 | 2 | 3 | | | |
| R | R | R | 1 | 2 | 3 |
| R | R | S | 3 | 1 | 2 |
| R | S | R | 2 | 1 | 3 |
| R | S | S | 3 | 2 | 1 |
| S | R | R | 1 | 2 | 3 |
| S | R | S | 3 | 1 | 2 |
| S | S | R | 1 | 2 | 3 |
| S | S | S | 3 | 1 | 2 |

In the left-hand 3 columns each address is labeled either R or S indicating regular or special, respectively. The designer arbitrarily selects a certain order of precedence for each possible combination of regular and special addresses. The order of precedence of addresses 1 to 3 and each combination in column 1 is indicated, on the corresponding line, in the right-hand 3 columns of Table I. For example, when all addresses are to be regular, addresses 1, 2, and 3 are selected in the order named provided all three addresses are available simultaneously or if, by chance, the addresses become available in that order. The order 1–2–3 is not necessarily the order in which the addresses are selected but is the order of precedence which applies when interference exists. Another way of expressing this order of precedence is to say that address 1 has precedence over address 2, address 1 has precedence over address 3, and address 2 has precedence over address 3. The set of ordered pairs 1, 2; 1, 3; and 2, 3 may be referred to as a rule of precedence which can be designated by the symbol $P_n$, where $n$ is any integer. The rule of precedence, therefore, when all addresses are regular is the set of three ordered pairs just mentioned. Likewise, when addresses 1 and 2 are regular and 3 is special, a second rule of precedence is obtained comprising the ordered pairs 3, 1; 3, 2; and 1, 2. Since there are eight lines in Table I corresponding to the eight possible arrangements of regular and special addresses for a 3-address time selector device, there are eight rules of precedence. It will be noted, however, that some of these rules of precedence are identical. For example, the rules of precedence corresponding to lines 1, 5, and 7 in Table I are identical, as also are those corresponding to lines 2, 6, and 8. The entire set of eight precedence rules may be referred to as a precedence group. As will be shown later, however, the number of precedence rules actually used is reduced to four.

From each precedence rule a precedence relation may be derived which may or may not contain all the ordered pairs in the precedence rule. The precedence relation, then, is any sub-set of a precedence rule and is obtained by omitting one or more or none of the ordered pairs comprising the precedence rule. For the system of three addresses, one may obviously derive a precedence relation for each precedence rule comprising 1, 2, or 3 ordered pairs. To distinguish a precedence relation from a precedence rule the symbol $p'_n$ will be used, where $n$ may take on any integral value.

Before proceeding further, it should be stated that the rules of precedence, while arbitrarily selected in advance by the designer, are subject to certain restrictions. The restrictions which the rules of precedence must satisfy are as follows:

(1) At all times, one and only one rule of precedence can apply.

(2) Whatever rule of precedence is chosen, each address must never have precedence over itself.

(3) If one address has precedence over another address and said other address has precedence over a third address, the first-mentioned address has precedence over the third-mentioned address. Thus, precedence has the mathematical property of transitivity.

(4) Of two addresses which are not the same, one has precedence over the other or else the other has precedence over the one. In other words, no two addresses can be selected on the same minor cycle.

(5) The precedence between any two addresses or group of addresses is independent of the condition (regular or special) of any other addresses so long as the condition of these two addresses does not change.

(6) All other addresses remaining undisturbed, whenever the condition of an address is changed from regular to special, that address may be promoted in precedence, but not demoted.

Rules 2, 3 and 4 may be summarized by saying that a rule of precedence constitutes mathematically a strict linear ordering of all the addresses.

The first five restrictions on the rules of precedence are more or less natural. The last one, however, is artificial and is introduced because of certain requirements of design of the time selector device.

To illustrate restriction 3, assume that line 2 of Table I were altered to

| 1 | 2 | 3 | | | |
|---|---|---|---|---|---|
| R | R | S | 3 | 2 | 1 |

In this case, restriction 5 would be violated, for although addresses 1 and 2 remain regular in line 2, the precedence between addresses 1 and 2 would be changed so that now address 2 would have precedence over address 1. The designer thus could not select the order of precedence 3-2-1 corresponding to the condition that addresses 1 and 2 were regular and address 3 special.

To illustrate restriction 6 assume the following orders of precedence were arbitrarily selected for the condition shown below

| Address | | | Order of Precedence | | |
|---|---|---|---|---|---|
| 1 | 2 | 3 | | | |
| R | R | S | 3 | 2 | 1 |
| R | S | R | 3 | 1 | 2 |

It is evident that restriction 6 has been violated, inasmuch as address 2, on being changed from regular to special, has been demoted in precedence.

The method proposed in this invention for activating the selection flip-flops corresponding to special addresses, and for establishing the various rules of precedence which may occur when different addresses are special, is to provide a sequence of identification pulses and precedence pulses. For this purpose the addresses are divided into sets; to each set corresponds an array of precedence gates and a pair of clock pulses for special address identification and establishment of precedence.

In order to accomplish this, a group of precedence classes must first be established. The first class consists of those addresses which are not promoted by being made special and will be referred to as the N class. Class N is the class of all addresses $b$ having the property that, for every address $a$ (except $b$), there is some time such that one or both of the following statements is true, viz., (1) Address $b$ is regular and has precedence over address $a$.

(2) Address $a$ is regular and address $b$ is special and $a$ has precedence over $b$. That is, for all values of $a$, either statement (1) must be true at some time or statement (2) must be true for some time, for the value of $b$ under consideration.

Referring now to the precedence group chosen in Table I, let $b$ be the address 1. If $a$ is address 2, statements (1) is seen to be true for the condition in line 1 of the table. That is, when address 1 is regular, it has precedence over address 2 at the time when all addresses are regular. It is not necessary to check other times, corresponding to other lines of the table, since one time (corresponding to line 1) has been found to exist at which for a given $b(b=1)$, and for $a=2$, statement (1) is true at any time. It is not necessary to check the truth of statement (2) for $b=1$, $a=2$. It is now necessary to determine whether, when $b$ is still 1, but $a$ is 3, either statement (1) or statement (2) is true. From line 1 of Table I it is at once apparent that when address 1 is regular it has precedence over address 3. Thus statement (1) is true for $a=3$. Since all values of $a$ have been checked for a given value of $b=1$ and at least one of the two statements are true for some time, it is now possible to say that class N contains address 1.

Now let $b=2$. If $a$ is made equal to 1, an inspection of lines 1, 2, 5, and 6 of Table I indicates that statement (1) is never true, for whenever address 2 is regular, it never has precedence over address 1. An inspection of lines 3 and 4 of Table I for $b=2$, $a=1$ indicates that statement (2) is never true. Since there is no time, for $b=1$, at which at least one of statements (1) and (2) is true for $a=1$, it is at once evident that class N does not contain address 2.

If address 3 is next made address $b$ and $a$ is made address 1, lines 1, 3, 5, and 7 of the table indicate that statement (1) is never true; moreover, lines 2 and 4 of Table I indicate that statement (2) is never true. One need not examine the truth of statements (1) and (2) when $a=2$ since for some value of $a$ neither statement (1) nor statement (2) is true at any time. Class N, therefore, does not contain address 3.

From the above discussion, it is evident that class N contains only address 1.

The next class of addresses to be considered will be denoted as class $M_b$ and is the class of all addresses $a$ (which are not $b$) such that at all times both of the following statements are true.

(I) If address $a$ has precedence over address $b$ then $b$ is not special.

(II) If address $a$ is special and address $b$ is regular then $a$ has precedence over $b$.

Let address 1 be address $b$ and addresses 2 and 3 be address $a$. An inspection of lines 3 and 4 of Table I will indicate that statement (I) is always true for $a=2$. As can be seen by inspection of lines 3 and 4 of the table, statement (II) is always true for $a=2$. Since statements (I) and (II) are both true at all times for $a=2$, address 2 is a member of class $M_1$.

Statement (1) is not always true for $a=3$, from lines 6 and 8 of Table I. Statement (II) is always true for $a=3$ (lines 2 and 4). However, since only statement (II) is always true for $a=3$, address 3 is not a member of class $M_1$. Inasmuch as an address may not be in its own M class, $M_1$ is the class of addresses consisting only of address 2.

Let $b$ be address 2 and $a$ be addresses 1 and 3. Statement (I) is not always true for either $a=1$ (see lines 7 and 8 of Table I) or for $a=3$ (see lines 4 and 8). Regardless of whether or not statement (II) is true, $M_2$ does not contain address 1 or 3. Class $M_2$, therefore, is empty.

In like manner it can be shown both addresses 1 and 2 belong to class $M_3$.

The class of all addresses which are ever special will be referred to as class $\Sigma$. Since all three addresses at some time may be special, $\Sigma$ contains addresses 1, 2, and 3.

A class $J_1$ is next defined as the class of all addresses $b$ such that class $M_b$ is empty and address $b$ is a member of class $\Sigma$. All addresses in the example of Fig. 7 are a member of $\Sigma$ and the M class is empty for address 2. Address 2, therefore, is a member of $J_1$.

A class $J_0$ is defined as a class whose members are a common part of $J_1$ and N. Since $J_1$ contains address 2 and class N contains address 1, there is no common part in $J_1$ and N and class $J_0$ is empty.

Class $J_2$ is that class containing all addresses $b$ which are ever special for which every member of class $M_b$ is also a member of $J_1$. Every member of class $M_1$ (which comprises address 2 only) is a member of class $J_1$. A null class such as class $M_2$ is included in every class. Address 2, therefore, is also a member of class $J_1$. Class $J_2$ thus comprises addresses 1 and 2.

Class $J_3$ is that class containing all addresses $b$ which are ever special for which every member of class $M_b$ is also a member of $J_2$ Every member of class $M_1$ (consisting only of address 2) and $M_3$ (comprising addresses 1 and 2) are members of $J_2$. In addition, the null class $M_2$ is included in class $J_2$ so that address 2 is also a member of class $J_2$. Class $J_3$, therefore, contains all three addresses 1, 2, and 3.

It is evident that the J classes expand, that is, every $J_n$ includes all the $J_m$'s for which $m$ is less than $n$.

For determining a sequence of special identification pulses it is desirable to determine a set of classes such that each address belongs to one and only one of them. This purpose is accomplished by means of a group of classes denoted as K classes. Note that there may be more than one address in a given K class, however. The class $K_n$ is the class obtained by removing the members of class $J_{n-1}$. In other words, $K_n = J_n - J_{n-1}$. When $n=0$, $K_0$ will obviously be equal to $J_0$; in other words, class $K_0$ is empty. Class $K_n$ is the common part of class $J_n$ and what is not in class $J_n-1$. That is, $K_1$ is the common part of $J_1$ and what is not in $J_0$. Since $J_1$ in this case contains address 2 and all three addresses are not in $J_0$, the common part is address 2. Class $K_1$ thus contains address 2.

Likewise class $K_2$ is the common part of $J_2$ (comprising addresses 1 and 2) and what is not in class $J_1$, viz., addresses 1 and 3. Class $K_2$ thus contains address 1.

Finally, class $K_3$, being the common part of $J_3$ (addresses 1, 2, and 3) and what is not in class $J_2$, viz., address 3, contains address 3. In general the precedence classes $K_0$, $K_1$ . . . $K_n$ are mutually exclusive but not exhaustive unless the class $\Sigma$ is exhaustive. The K classes always exactly exhaust class $\Sigma$. An address which is never special belongs to none of the precedence classes $K_0$ . . . $K_n$.

The purpose of these K classes is to enable the designer to determine the sequence in which the various special address identifications must occur, that is, to establish the order of occurrence of clock pulses feeding the identification gates associated with the flip-flops of the auxiliary array.

The addresses belonging to any precedence class $K_n$ are to be identified as special before those of class $K_n+1$. After each such identification a new rule of precedence is to be established. With each precedence class $K_n$ there is to be associated a precedence relation $p'_n$ and a gating array to realize this precedence relation.

To establish the necessary auxiliary precedence gating arrays, it is necessary to obtain the rule of precedence $p_n$ which applies when all those and only those addresses which are members of class $J_n$ are special. The rules of precedence $p_0$ . . . $p_3$ are obtained by inspecting Table I. To obtain the first rule of precedence $p_0$, it is necessary to observe which addresses which are members of $J_0$ are special. Since there are no addresses in $J_0$ there are no special addresses and the precedence rule $p_0$ is obtained from line 1 on Table I. Rule $p_0$ is thus the regular rule of precedence and contains the ordered pairs of addresses 1, 2; 1, 3; and 2, 3.

To obtain $p_1$ one observes which addresses which are members of $J_1$ are special. Class $J_1$ contains address 2. In line 3 of Table I address 2 only is special. On the right-hand columns of line 3, the ordered pairs comprising the precedence rule $p_1$ are 2, 1; 2, 3; and 1, 2.

To obtain $p_2$ the contents of class $J_2$ are examined. Class $J_2$ contains addresses 1 and 2. In line 7 of Table I addresses 1 and 2 are special. The precedence rule of $p_2$ will be seen to be identical to that of rule $p_0$ and contains the ordered pairs 1, 2; 1, 3; and 2, 3.

Finally, $p_3$ is found by examining the contents of class $J_3$ which contains all three addresses. When all three addresses are special it is found from the last line of Table I that the rule of precedence $p_3$ is the set consisting of 3, 1; 1, 2; and 3, 2.

As will be more fully described later, it is possible in practice to realize only a part of the precedence rule, i. e., a precedence relation. To realize a precedence relation, there must be some element or elements in the time selector device which insures that when two or more addresses are ready for selection in the same minor cycle the address of higher precedence is selected. The element or elements used to realize the precedence relation consists of an array of gates of which the simple precedence array of the basic array of Fig. 1 is an example. The precedence gate will be said to correspond to the addresses $a$ and $b$ of a precedence relation and the clock pulse $v$, if the gate has exactly two inputs, one of which receives a signal from the active side of the selection flip-flop corresponding to address $a$ and one of which receives a clock pulse $v$, and if the output of said gate resets the selection flip-flop corresponding to address $b$.

Each precedence array consists of a set of precedence gates and realizes to a particular precedence relation $p'_n$ by means of a particular clock pulse $v$. Each gate in the set has one of its inputs connected to one and only one selection flip-flop corresponding to an address $a$ of the ordered pair $a$, $b$ in case $a$ has precedence over $b$ according to the precedence relation $p'_n$. The output of said gate is applied to the reset side of the selection flip-flop corresponding to the address $b$ of the aforesaid ordered pair $a$, $b$.

The identification gates of the auxiliary array corresponding to the addresses in class $K_0$ receive an identification clock pulse. Then the precedence gates which realize the precedence relation $p'_0$ receives a precedence clock pulse. If $K_0$ is empty, no identification clock pulse occurs before the first precedence clock pulse. For every $n$ greater than 0 the following rules hold.

1. The clock pulse applied to the identification gate of the auxiliary array corresponding to an address in class $K_n$ follows the clock pulse supplied to the gate which realizes the precedence relation $p'_{n-1}$.

2. The clock pulse applied to the precedence gate which realizes the precedence relation $p'_n$ follows the clock pulse applied to the identification gate of the auxiliary array corresponding to the address in class $K_n$.

3. If $K_n$ is empty, neither of the clock pulses mentioned in rules 1 and 2 above exist.

4. No other pulses exist which may set or reset any selection flip-flops or reset any flip-flops of the auxiliary array, between the realization of $p'_0$ and the realization of $p'_n$ for the highest $n$ for which $K_n$ is not empty.

These involved principles are better illustrated by referring to a typical 3-address time selection device using the auxiliary array shown in Fig. 7 and based upon the precedence group of Table I.

The sequence of events which occur in the operation of the auxiliary array, taken in conjunction with the basic array, follows. Before the addresses are presented for selection, that is, before the master start pulse arrives, external devices in the computer (which are not a part of the subject invention) determine which, if any, addresses are to be selected independently of time and generate control pulses on lines 5 which set the corresponding flip-flops FA of the auxiliary array. These control pulses, like the pulses on lines 10 of Fig. 5, occur only once for each set of addresses presented for selection and are not supplied again to the auxiliary flip-flops FA until the next set of addresses is ready to be presented for selection. Note, however, that it is not necessary that all or any of the addresses be special on a given minor cycle. In other words, there may be a control pulse on any one of lines $5a$, $5b$ or $5c$ or no pulses whatsoever on these lines, depending upon the set-up of the external computer device above described. The master start pulse appears on line 11 and the selection circuits begin their search for the proper time to identify addresses.

Clock pulse B next sets or activates at basic array selection flip-flops $S_1$ to $S_3$. The usual time identification reset pulses are applied over the approximate lines one to three if, on any given minor cycle, the corresponding address is not ready for selection. If, on said minor cycle, some address is ready for selection, there will be no corresponding reset pulse so that the associated selection flip-flop will remain set. As was previously pointed out in connection with Fig. 2, it is possible to perform selection based on the generation of input pulses on line one to three during agreement.

Clock pulse C is next applied to the gates II controlled by the memory flip-flops M to reset the selection flip-flops corresponding to addresses that have already been selected.

Clock pulse D is applied to gate 74; the function of this pulse will be described more fully later.

The output of each auxiliary flip-flop $FA_1$, $FA_2$ and $FA_3$, if any, is connected to an auxiliary identification gate 71, 72 and 73, respectively. The first auxiliary identification clock pulse is applied to the identification gate on the auxiliary flip-flop corresponding to the address in the first K class which is not empty. In this case, $K_0$ is empty while the first K class which is not empty is $K_1$ which contains address 2. The first identification clock pulse F, therefore, is applied to auxiliary identification gate 72 which is connected to flip-flop $FA_2$, corresponding to address 2. The next auxiliary identification clock pulse to appear, namely pulse H, is supplied to auxiliary identification gate 71 on auxiliary flip-flop $FA_1$ corresponding to address 1 since the next K class, that is $K_2$, contains address 1. Lastly, the third identifier pulse, that is, pulse K, is applied to gate 73 on auxiliary flip-flop $FA_3$ corresponding to address 3, inasmuch as class $K_3$ contains address 3.

The outputs from auxiliary identification gates 71 to 73, if any, are connected to one input of the identification gates $I_a$, $I_b$ and $I_c$, respectively, of the basic array which, in turn, correspond to the selection flip-flops $S_1$, $S_2$ and $S_3$, respectively. Whenever master start flip-flop $F_s$ is active, any output derived from gates 71 to 73 pass gates I and set the corresponding selection flip-flop.

A set of auxiliary precedence gates 74, 75 and 76 is connected to the output side of selection flip-flops $S_1$, $S_2$ and $S_3$, respectively.

The precedence rules previously determined are listed in Table II below.

Table II

| Class | Precedence Rule | Ordered Pairs | | |
|---|---|---|---|---|
| $K_0$ | $p_0$ | 1, 2 | 1, 3 | 2, 3 |
| $K_1$ | $p_1$ | 2, 1 | 2, 3 | 1, 3 |
| $K_2$ | $p_2$ | 1, 2 | 1, 3 | 2, 3 |
| $K_3$ | $p_3$ | 3, 1 | 1, 2 | 3, 2 |

As previously described, each precedence gate is connected to a selection flip-flop corresponding to address $a$ of the ordered pair $a$, $b$ of the precedence rule and the output of said gate is connected to the reset side of the selection flip-flop corresponding to address $b$.

To realize precedence rule $p_0$, therefore, a precedence gate 74 receives inputs from selection flip-flop $S_1$ corresponding to address 1 of the ordered pairs 1, 2 and 1, 3, as well as precedence clock pulse D. When pulse D arrives, provided that $S_1$ is active, it passes gate 74 and resets both of selection flip-flops $S_2$ and $S_3$. In order to accommodate the ordered pair 2, 3, the output of selection flip-flop $S_2$ is connected to gate 77 which also receives clock pulse D. The output of gate 77 resets selection flip-flop $S_3$. In the above manner, the normal order of precedence is established. Gates 74 and 77 perform the same function as gates III of Fig. 1.

Note that no clock pulse in Fig. 7 is designated as E. As already mentioned, clock pulse E of Figs. 1 to 6 occurs at the end of the minor cycle. The auxiliary identification and precedence clock pulses, designated as F to L in Fig. 7, occur before the end of each minor cycle. The clock pulse occurring at the end of the minor cycle in Fig. 7, and corresponding to clock pulse E of Figs. 1 to 6, will be designated as clock pulse M.

It should be noted here that the description of Fig. 7 immediately following is intended to reveal the various circuit connections and does not imply that, every time a precedence pulse arrives at any precedence gate, it will pass through said gate. Actually, the precedence pulse will pass the corresponding precedence gate only when the associated flip-flop is active. Likewise, every time a pulse passes a precedence gate, it will actually be effective in resetting only those flip-flops which are at that moment active. The sequence of events occurring prior to arrival of precedence pulses will determine which gates are open and which selection flip-flops are reset.

In order to facilitate discussion and to show the interrelation of the various auxiliary clock pulses, it will be assumed that all addresses are special on a given minor cycle, that is, that lines 5a, 5b and 5c are all hot, although, as previously stated, this need not be the case. For example, if it is stated that identification gate 72 is open, it will be understood that it is open provided there has been a control input pulse on line 5b; also, if address 2, for example, is not special in a given minor cycle, gate 72 will not open.

Next, an identification clock pulse F arrives at auxiliary identification gate 72 which is already open as a result of the activity of auxiliary flip-flop $FA_2$. The clock pulse F sets up selection flip-flop $S_2$. Precedence rule $p_1$ now must be satisfied.

Before proceeding further, however, it can be shown that certain ordered pairs in the various precedence rules are superfluous and can be eliminated, thereby simplifying the precedence gating array without affecting the operation of the time selector device.

The establishment of the precedence of one address over another can be deferred to a precedence rule or relation of larger $n$ so long as the order of precedence of the two addresses in question is not reversed, and provided that the correct precedence is ultimately established. For example, the ordered pair 2, 3 may be eliminated from precedence rule $p_0$ since it appears in precedence rule $p_1$. In this way, one obtains a precedence relation $p'_0$ comprising only two ordered pairs, namely, 1, 2 and 1, 3.

Furthermore, an inspection of Table II will indicate that certain ordered pairs of addresses are redundant in the sense that precedence between the address is established in some earlier precedence relation and neither address comprising the pair has subsequently been identified as special. For example, the ordered pair 1, 3 in precedence rule $p_1$ is redundant since it appears in precedence rule $p_0$. However, the ordered pair 1, 3 in $p_2$ is not redundant because address 1 belongs to class $K_2$. Similarly, the ordered pair 2, 3 of precedence rule $p_2$ and the ordered pair 1, 2 in rule $p_3$ are redundant. The precedence relations obtained by eliminating redundant ordered pairs is shown in Table III below.

Table III

| Precedence Relation | Ordered Pairs | |
|---|---|---|
| $p'_0$ | 1, 2 | 1, 3 |
| $p'_1$ | 2, 1 | 2, 3 |
| $p'_2$ | 1, 2 | 1, 3 |
| $p'_3$ | 3, 1 | 3, 2 |

Since the ordered pair 2, 3, can be eliminated from rule $p_0$, it becomes obvious that gate 77 is no longer necessary and may be omitted. The gates corresponding to ordered pairs which have been eliminated from precedence rules $p_1 \ldots p_3$ are not shown in Fig. 7.

On the basis of the prior description, therefore, precedence rule $p_1$ may be supplanted by precedence relation $p'_1$ containing address pairs 2, 1 and 2, 3. This relationship is realized by means of precedence gate 75 which received inputs from selection flip-flop $S_2$ and precedence clock pulse G and serves to reset selection flip-flops $S_1$ and $S_3$.

Identification clock pulse H next arrives at opened auxiliary identification gate 71 and sets up selection flip-flop $S_1$, assuming, of course, that there has been a pulse on line 5a.

To establish precedence relation $p'_2$, a precedence clock pulse J is applied to gate 74 which is open whenever $S_1$ is active. This clock pulse passes through precedence gate 74 and resets $S_2$ and $S_3$.

Identification clock pulse K next passes open auxiliary identification gate 73 and sets $S_3$.

A precedence clock pulse L then passes precedence gate 76 which, because of the activity of $S_3$, is open.

The output of gate 76 resets $S_1$ and $S_2$. In this manner, precedence relation $p'_3$ is satisfied.

Finally, clock pulse M, corresponding to clock pulse E of Figs. 1 through 6, is supplied to output gates IV and passes through whichever one, if any, corresponds to an active selection flip-flop, in the manner previously described in connection with Fig. 1.

To illustrate one typical case, assume that the computer determines that address 2 shall be special on a given minor cycle; that is, a pulse appears on line 5b. Assume also that on this minor cycle agreement first occurs for address 3. Clock pulse B will set up all selection flip-flops. Flip-flop $S_3$ only will remain active since $S_1$ and $S_2$ will be reset by disagreement pulses on lines 1 and 2. Pulses C and D obviously will be ineffective. Special (auxiliary) identification flip-flop $FA_2$ only will be set up. Clock pulse F will pass open gate 72 as well as gate $I_b$ to set $S_2$. Clock pulse G will hit gate 75 which is now open since $S_2$ has just been set. Pulse G, therefore, will pass gate 75 and will reset $S_1$ and $S_3$. Pulse H cannot pass gate 71 since there has been no control pulse on line 5a to set auxiliary flip-flop $FA_1$. Selection flip-flop $S_1$ will remain inactive and the gate 74 will be closed thus rendering clock pulse J inactive. Pulse K cannot pass gate 73 since, in the absence of a control pulse on line 5c, there is no output from auxiliary flip-flop $FA_3$. Since $S_3$ remains inactive pulse L cannot pass precedence gate 76.

When clock pulse M arrives at the output gates IV only gate $IV_b$ is open, since selection flip-flop $S_2$ is the only active one. Pulse M thus passes gate $IV_b$ and address 2 only is selected.

In other words, whether or not an address is regularly available for selection on the minor cycle during which an address is to be made special, the special address will be selected and the regular address will be inhibited until a later memory cycle when agreement has precedence over the regular address.

It so happens in this embodiment that no regular address ever has precedence over a special address, but this need not necessarily be the case.

Once special address 2 has been selected, however, the associated memory flip-flop $M_2$ of the basic array will be activated and, at C time on the next minor cycle, clock pulse C will pass gate $II_b$ and will reset not only selection flip-flop $S_2$ but also auxiliary flip-flop $FA_2$.

Now suppose that addresses 2 and 3 are to be made special on the same minor cycle. If there should be agreement indicated by the time identifier of the basic array for some address, it has been shown that said address will be inhibited whenever one address is special, provided that the special address has precedence over the regular address. Assume, for the sake of explanation, that there is no agreement as per the time identifier. Clock pulse B will set up $S_1$ to $S_3$ but they will be reset by pulses appearing on input lines 1 to 3. Clock pulse D is inactive since gate 74 is closed. Clock pulse F passes open gates 72 and $I_b$ and sets up $S_2$. Precedence gate 75 is now opened and clock pulse G passes through; it is ineffective, however, since $S_1$ and $S_2$ have already been reset. Clock pulse H is inactive since there is no control pulse on line 5a to activate $FA_1$. Clock pulse J cannot pass closed gate 74. Clock pulse K passes gates 73 and $I_c$ and sets up $S_3$. Precedence gate 76 is opened and clock pulse L passes through to reset $S_2$. At M time, clock pulse M hits output gates IV but finds only gate $IV_c$ open. Address 3 only is selected.

In other words, where two or more special address control pulses occur simultaneously only one address would be selected on a given minor cycle; the other special address or addresses would be selected on succeeding minor cycles. It is not necessary in the case of a special address, which is suppressed because of precedence, that the suppressed address wait for a whole memory cycle to be selected.

In the above example, illustrated in Fig. 7, it has been assumed that all three addresses are, at some time, special.

A circuit will now be described in which one of the addresses, that is, address 2, is never made special. This circuit is shown in Fig. 8.

It is necessary to set up a Table IV similar to that of Table I supra, in which address 2 is always regular. An arbitrary order of precedence is established as shown in Table IV, subject, of course, to restrictions previously enumerated.

*Table IV*

| Address | | | Order of Precedence | | |
|---|---|---|---|---|---|
| 1 | 2 | 3 | | | |
| R | R | R | 1 | 2 | 3 |
| S | R | R | 1 | 2 | 3 |
| R | R | S | 1 | 3 | 2 |
| S | R | S | 1 | 3 | 2 |

Note that, although address 3 is promoted by being made special, it is still subordinate to regular address 1. It is not essential that an address which is promoted by being made special have precedence over all regular addresses.

Following the method previously outlined in connection with Fig. 7, it may be shown that class N contains address 1, that all $M_b$ classes are empty, that $J_0$ contains address 1 and $J_1$ contains addresses 1 and 3. Also, class $K_0$ is found to contain address 1, class $K_1$ to contain address 3 and class $K_2$ to be empty.

The rule of precedence $p_0$ contains ordered pairs 1, 2; 2, 3 and 1, 3 while $p_1$ contains ordered pairs 1, 3; 3, 2 and 1, 2.

Since one of the K classes is empty only two auxiliary identification clock pulses, associated auxiliary flip-flops and identification gates are required. The first identification clock pulse F is applied to gate 71 on auxiliary flip-flop $FA_1$ corresponding to the address 1 in class $K_0$.

Since the precedence of one address over another may be deferred to a precedence rule of larger $n$ so long as the order of precedence of the two addresses in question is not reversed, the ordered pairs 1, 2 and 1, 3 are redundant in $p_0$. The precedence relation $p'_0$, therefore, contains only the ordered pair 2, 3. The precedence gate 77 takes care of this ordered pair.

The second auxiliary identification clock pulse H is applied to auxiliary flip-flop $FA_2$ corresponding to the address 3 in class $K_1$.

Precedence relation $p'_1$ must now be realized. This relation contains all the ordered pairs of the precedence rule $p_1$ since none of these pairs are redundant. The precedence clock pulse J, which follows auxiliary identification clock pulse J, is applied to precedence gates 74 and 76 simultaneously. Gate 74 takes care of the ordered pairs 1, 2 and 1, 3 while gate 76 handles ordered pair 3, 2.

If the order of precedence arbitrarily selected in lines 3 and 4 of Table IV had been 3–1–2 instead of 1–3–2, it is obvious that a different auxiliary precedence array would be necessary, since the J and K classes, as well as the precedence relations, would be changed.

In Fig. 9 a time selector device similar to that shown for the three-address system of Figs. 7 and 8 is shown involving two addresses. In Fig. 9 each of the two addresses may be special at one time or another. As in the device of Figs. 7 and 8, it is necessary to establish the various classes of addresses. It will be assumed, for purposes of illustration, that the precedence group arbitrarily chosen is that shown in Table V.

Table V

| Address | | Order of Precedence | |
|---|---|---|---|
| 1 | 2 | | |
| R | R | 1 | 2 |
| R | S | 2 | 1 |
| S | R | 1 | 2 |
| S | S | 2 | 1 |

By applying the test previously used in determining the N classes, it is found that statement (1) is true on two occasions (see lines 1 and 3 of Table V) when $b=1$ and $a=2$, but that neither of statements (1) or (2) is ever true for $a=1$ and $b=2$. In other words, class N contains only address 1.

Likewise, in determining the $M_b$ classes, it will be found that when $b=1$ and $a=2$, statement (I) is not always true (see line 4 of Table V); class $M_1$, therefore, is empty. Both statements (I) and (II) are true all the time when $b=2$ and $a=1$. In other words, class $M_2$ contains address 1.

Class $J_1$ is the class of all addresses $b$ such that class $M_b$ is empty and $b$ is sometimes special. Class $M_1$ is empty and address 1 is sometimes special. Class $J_1$, therefore, contains address 1.

Class $J_0$ is the class whose members are a common part of $J_1$ and N. Class $J_0$, therefore, contains address 1.

Class $J_2$ is the class of addresses $b$ which are sometimes special for which every member of class $M_b$ is a member of $J_1$. Every member of class $M_2$ (address 1) is a member of class $J_1$. Also the null class $M_1$ is included in class $J_1$. Class $J_2$ thus contains addresses 1 and 2.

Investigating the K classes, it will be found that class $K_0$, which is identical to class $J_0$, contains address 1. Class $K_1$ being the common part of class $J_1$ (address 1) and what is not in class $J_0$ (address 2) is empty.

Class $K_2$ is the common part of $J_2$ (addresses 1 and 2) and what is not in class $J_1$, namely, address 2, and, therefore, contains address 2.

Since the precedence rule contains only one ordered pair in the two-address system, the precedence relation contains one ordered pair or none.

Applying the precedence rules outlined previously, $p_0$ is the rule of precedence which applies when all those and only those addresses are special which are members of $J_0$, that is, the rule applying when address 1 only is special. Inspection of line 3 of Table V indicates that the order of precedence is 1–2. That is, rule of precedence $p_0$ comprises the ordered pair 1, 2.

The only member of $J_1$, which is special, is address 1. Rule $p_1$, consequently, is identical to rule $p_0$.

The members $J_2$ which are ever special are addresses 1 and 2. When both addresses 1 and 2 are special, line 4 of Table V indicates the order of precedence to be 2–1. Rule of precedence $p_2$ contains the ordered pair 2, 1.

From the rule stated in column 24, when class $K_0$ is not empty, the identification pulses for the special addresses in class $K_0$ precede the auxiliary precedence pulse which realizes the rule of precedence $p_0$. In other words, the auxiliary time identification pulse F is the first pulse after clock pulse C, and pulse F is followed by the auxiliary precedence pulse G corresponding to $P_0$, which contains ordered pair 1, 2.

Since class $K_1$ is empty, however, there is no auxiliary identification pulse for the addresses in $K_1$. Precedence rule $p_1$ is ordinarily realized after the introduction of auxiliary identification pulse $K_1$ to the time selector. This rule, however, is redundant since there are no pulses whatever occurring in the time selector between the precedence pulse G corresponding to $p_0$ and the time for realization of precedence rule $p_1$. Hence, precedence rule $p_1$ may be omitted; that is, precedence relation $p'_1$ is empty. Next, the auxiliary time identification pulse H for the addresses for $K_2$ appears and, finally, the precedence relation $p_2$, consisting of ordered pair 2, 1 is realized by auxiliary precedence clock pulse J.

The first identification clock pulse F goes to the gate 71 on auxiliary flip-flop $FA_1$ corresponding to the addresses in class $K_0$, namely, address 1. The second identification pulse H goes to the gate 72 on auxiliary flip-flop $FA_2$ corresponding to the address in class $K_2$, or address 2. It will be noted that class $K_1$ is empty.

The precedence rule $p_0$ is realized by a gate 74 responsive to the output of $S_1$ and to auxiliary precedence pulse G, and its output is connected to the reset side of $S_2$. Precedence rule $p_1$ is redundant. Precedence rule $p_2$ is realized by a gate 75 responsive to the output of $S_2$ and auxiliary precedence clock precedence J, and having its output connected to the reset side of $S_1$.

If a control pulse appears on line $5a$, indicative that address 1 is to be special, the following events occur.

Clock pulse B sets up both $S_1$ and $S_2$. Even should agreement occur for regular address 2 and, consequently, selection flip-flop $S_2$ remain active, when auxiliary identification clock pulse F arrives it passes through open gate 71 on active flip-flop $FA_1$ and gate $I_a$ and sets up $S_1$. Precedence clock pulse G follows and passes opened gate 74, resetting $S_2$. Pulse H is ineffective since gate 72 is closed in the absence of a control input pulse on line $5b$ and pulse J is ineffective since gate 75 is closed during the absence of a set pulse on $S_2$ following the prior resetting of $S_2$. At M time clock pulse M would pass gate $IV_a$ which was opened by the setting up of $S_1$ and address 1 would be selected.

In other words, address 1 is selected immediately when it is made special in spite of the fact that address 2 may be presented for selection by the time identifier during the same minor cycle.

Similarly, if address 2 is made special by the presence of a control input pulse on line $5b$, it matters not that address 1, which ordinarily would have precedence, either regular or special, is presented for selection by the time identifier. In this case, as soon as clock pulse H passes gate 72 (which gate is open as a result of the setting of $FA_2$) and gate $I_b$ (which is opened as a result of the continued activation of start flip-flop $F_s$) $S_2$ would be activated, even though previously reset by clock pulse G, and clock pulse J would pass through the now opened gate 75 and would reset $S_1$. Clock pulses F and G are ineffective since there is no control input pulse on line $5a$. At M time, therefore, clock pulse M would pass gate $IV_b$ only and address 2 only would be selected.

If, for some reason, both addresses 1 and 2 were made special on the same minor cycle, the auxiliary identification and precedence clock pulses last appearing, namely, pulses H and J, would control any previous operations. Clock pulse H would activate $S_2$ and clock pulse J would reset $S_1$ just prior to the arrival of clock pulse M. Pulse M would then pass through output gate $IV_b$ corresponding to address 2.

In case neither address is to be special (in the absence of auxiliary control input pulses from lines $5a$ and $5b$), and interference occurs between addresses 1 and 2 of which address 1 has precedence, identification clock pulse G will pass gate 74 and reset selection flip-flop $S_2$ thereby inhibiting selection of address 2. Also, since $S_2$ is now reset, gate 75 will be closed and precedence clock pulse J will be unable to pass gate 75 to reset $S_1$. Address 1, therefore, is the only address transmitted.

In the absence of interference the first of the two regular addresses for which agreement occurs will be selected. Note that, if agreement occurs for regular address 2 before agreement occurs for regular address 1, selection flip-flop $S_1$ would be inactive and pulse G could not pass closed gate 74 to reset selection flip-flop $S_2$. Address 2 would then be selected and address 1 would be selected subsequently when agreement again occurs for address 1.

It should be understood that the precedence group set forth in Table V is only one of three possible precedence groups for a two-address system. It is possible to set up two other precedence groups as shown in Tables VI and VII below:

Table VI

| Address | | Order of Selection | |
|---|---|---|---|
| 1 | 2 | | |
| R | R | 1 | 2 |
| R | S | 2 | 1 |
| S | R | 1 | 2 |
| S | S | 1 | 2 |

Table VII

| Address | | Order of Selection | |
|---|---|---|---|
| 1 | 2 | | |
| R | R | 1 | 2 |
| R | S | 1 | 2 |
| S | R | 1 | 2 |
| S | S | 1 | 2 |

The case exemplified in Table VI is illustrated in Fig. 10. An examination must now be made to determine the various classes of addresses.

Examining the N classes, when $b=1$ and $a=2$, statement (I) is true, so that class N contains address 1. When $b=2$ and $a=1$, neither of statements (I) and (II) are true. Class N, therefore, does not contain address 2.

An examination of the $M_b$ classes indicates that both statements (I) and (II) are true when $b=1$ and $a=2$, so that class $M_1$ contains addresses 2. When $b=2$ and $a=1$, statement (I) is not true at all times, so that class $M_2$ is empty.

It may now be shown that class $J_1$ contains address 2, $J_0$ is empty and $J_2$ contains addresses 1 and 2.

Likewise, it may be shown that class $K_0$ is empty while classes $K_1$ and $K_2$ contain address 2 and address 1, respectively.

The precedence rule $p_0$ applies when all members of $J_0$ are special and contains the ordered pair 1, 2. The precedence rule $p_1$ obtaining when all membrs of $J_1$ are special, contains the ordered pair 2, 1. The precedence rule $p_2$ obtaining when all members of $J_2$ are special contains ordered pair 1, 2.

It is now easy to construct a circuit for this case. From the rules stated in column 24, if class $K_0$ is empty, the only identification clock pulse occurs before the first precedence clock pulse. The rule of precedence $p_0$ is realized by an auxiliary precedence clock pulse D applied to gate 74.

Next, the first identification clock pulse F goes to gate 72 on auxiliary flip-flop $FA_2$, corresponding to the address in class $K_1$, namely, address 2. Precedence $p_1$ is now realized by precedence clock pulse G which arrives at gate 75 and causes $S_1$ to be reset whenever $S_2$ is active.

The second identification clock pulse H goes to the gate 71 on auxiliary flip-flop $FA_1$ corresponding to the addressing class $K_2$, that is, address 1.

Finally, rule of precedence, $p_2$ is realized by precedence clock pulse J, which, like clock pulse D, is applied to gate 74.

The operation of the array of Fig. 10 is now obvious. Whichever address is special is preferred to the address which is regular, except in the case in which both addresses are special. In this case, the address corresponding to the last occurring auxiliary time identification clock pulse prevails.

The case exemplified in Table VII and shown in Fig. 11, which is the case in which the normal order of precedence is maintained throughout, will now be described.

It may be shown that, when $b=1$ and $a=2$, statement (1) is true so that class N contains addresses 1. When $b=2$ and $a=1$, statement (2) is true. Thus class N also contains address 2.

When $b=1$ and $a=2$, statement (II) is false, so that class $M_1$ is empty. When $b=2$ and $a=1$, statement I is sometimes false. Class $M_2$ also is empty.

An examination of the J classes will indicate that class $J_0$, $J_1$ and $J_2$ each contain both addresses 1 and 2.

Similarly, an examination of the K classes will indicate that class $K_0$ contains addresses 1 and 2, while both classes $K_1$ and $K_2$ are empty. It will be obvious now that all precedence rules, which depend upon which members of the corresponding J classes are special, are identical and contain the ordered pair 1, 2.

Although it should be obvious by this time, from merely glancing at Table VI, that only one auxiliary precedence gate is necessary, the rules previously applied will be applied here.

Since class $K_0$ is not empty, the identification clock pulse for the special addresses in $K_0$ arrive first after clock pulse C. Since class $K_0$ contains both addresses 1 and 2, the time identification pulse F is applied to the gates on both auxiliary flip-flops $FA_1$ and $FA_2$.

The precedence rule $p_0$ is satisfied by means of the gate 74 to which clock pulse G, occurring immediately after clock pulse F, is applied; gate 74 is connected to the output of $S_1$ and the output, if any, from gate 74 resets $S_2$.

Since the classes $K_1$ and $K_2$ are empty, no further time identification clock pulses are required. Moreover, since there are no control pulses occurring between the precedence pulse G corresponding to $p_0$ and the time for realization of precedence rules $p_1$ and $p_2$, the latter two precedence rules are redundant and may be omitted.

The auxiliary arrays described in Figs. 5 to 8 and the modification of the basic array of Fig. 1 for void addresses are independent and may be combined in any desired manner.

Whenever a priority array, such as shown in Fig. 5, is combined with an auxiliary array for special addresses, as exemplified by the system of Fig. 7, the control input pulses 5 and 10 may occur in any sequence so long as they occur prior to the master start pulse appearing on line 11. These pulses may even occur simultaneously. For example, control pulses 5a, 5b, and 5c may occur in the order named or in any sequence subject to the above restriction. The same is true of control pulses 10a and 10b. Furthermore, control input pulses 5a, 5b, 5c, 10a and 10b may occur concurrently, again subject to the above restriction.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A time selector for selectively transmitting recurring items of stored information comprising means for generating time-identification information indicating which of said recurring items of information are available for selection, selection control means corresponding to said time-identification information and activated whenever corresponding information items are available for selection, precedence means activated subsequent to activation of said selection control means for deactivating those of the activated selection control means associated with items of lower instantaneous precedence, output means connected to the selection control means associated with the item of information of highest instantaneous precedence for deriving output information indicative of the particular information item to be selected, and selection memory means responsive to said output information for inhibiting further derivation of output from said last-named selection control means until output information has been derived corresponding to all of said information items.

2. A time selector for selectively transmitting recurring items of stored information comprising means for generating time-identification information indicating which of said recurring items of information are available for selection, selection control means corresponding to said time-identification information and activated whenever corresponding information items are available for selection, precedence means activated subsequent to activation of said selection control means for deactivating those of the activated selection control means associated with items of lower instantaneous precedence, output means connected to the selection control means associated with the items of information of highest instantaneous precedence for deriving output information indicative of the particular information item to be selected, selection memory means responsive to said output information for inhibiting further derivation of output from said last-named selection control means until output information has been derived corresponding to all of said information items, and selection voiding means operable prior to the derivation of output information for activating said selection memory means corresponding to information items whose selection is to be inhibited.

3. A time selector for selectively transmitting recurring items of stored information comprising enabling means including a source of master start information for presenting said items of information for selection, means for generating time-identification information indicating which of said recurring items of information are available for selection, selection control means corresponding to said time-identification information and activated whenever corresponding information items are available for selection, precedence means activated subsequent to activation of said selection control means for deactivating those of the activated selection control means associated with items of lower instantaneous precedence, output means connected to the selection control means associated with the item of information of highest instantaneous precedence for deriving output information indicative of the particular information item to be selected, selection memory means responsive to said output information for inhibiting further derivation of output from said last-named selection control means until output information has been derived corresponding to all of said information items, and means responsive to derivation of output information from all of said output means for inactivating said enabling means.

4. A time selector for selectively transmitting recurring items of stored information comprising enabling means including a source of master start information for presenting said items of information for selection, means for generating time-identification information indicating which of said recurring items of information are available for selection, selection control means corresponding to said time-identification information and activated whenever corresponding information items are available for selection, precedence means activated subsequent to activation of said selection control means for deactivating those of the activated selection control means associated with items of lower instantaneous precedence, output means connected to the selection control means associated with the item of information of highest instantaneous precedence for deriving output information indicative of the particular information item to be selected, selection memory means responsive to said output information for inhibiting further derivation of output from said last-named selection control means until output information has been derived corresponding to all of said information items, selection voiding means operable prior to the derivation of output information for activating said selection memory means corresponding to information items whose selection is to be inhibited, and means responsive to derivation of output information from all of said output means for inactivating said enabling means.

5. A time selector for selectively transmitting recurring items of stored information comprising means for generating time-identification information groups corresponding to those of said recurring items of information as are available for selection, selection control means activated by said generating means, a precedence array actuated subsequent to activation of said selection control means for deactivating those of the activated selection control means corresponding to items of lower instantaneous precedence, output means connected to the selection control means associated with the item of highest instantaneous precedence for deriving output information indicative of the particular information item to be selected, and selection memory means responsive to said output information for inhibiting further derivation of output information from the last-named selection control means until output information has been derived corresponding to all of said information items.

6. A time selector for selectively transmitting recurring items of stored information comprising means for generating time-identification information groups corresponding to those of said recurring items of information as are available for selection, selection control means activated by said generating means, a precedence array actuated subsequent to activation of said selection control means for deactivating those of said selection control means not already inactive corresponding to items of lower instantaneous precedence, output means connected to the selection control means associated with the item of highest instantaneous precedence for deriving output information indicative of the particular information item to be selected, selection memory means responsive to said output information for inhibiting further derivation of output information from the last-named selection control means until output information has been derived corresponding to all of said information items, and selection voiding means operable prior to the derivation of output information for activating said selection memory means corresponding to information items whose selection is to be inhibited.

7. A time selector for selectively transmitting recurring items of stored information comprising enabling means including a source of master start information for presenting said items of information for selection, means for generating time-identification information groups corresponding to those of said recurring items of information as are available for selection, selection control means activated by said generating means, a precedence array actuated subsequent to activation of said selection control means for deactivating those of said selection control means not already inactive corresponding to items of lower instantaneous precedence, output means connected to the selection control means associated with the item of highest instantaneous precedence for deriving output information indicative of the particular information item to be selected, selection memory means responsive to said output information for inhibiting further derivation of output information from the last-named selection control means until output information has been derived corresponding to all of said information items, and means responsive to derivation of output information from all of said output means for inactivating said enabling means.

8. A time selector for selectively transmitting recurring items of stored information comprising enabling means including a source of master start information for presenting said items of information for selection, means for generating time-identification information groups corresponding to those of said recurring items of information as are available for selection, selection control means activated by said generating means, a precedence array actuated subsequent to activation of said selection control means for deactivating those of said selection control means not already inactive corresponding to items of lower instantaneous precedence, output means connected to the selection control means associated with the item of highest instantaneous precedence for deriving output information indicative of the particular information item to be selected, selection memory means responsive to said output information for inhibiting further derivation of output information from the last-named selection control means until output information has been derived corresponding to all of said information items, selection voiding means operable prior to the derivation of output information for activating said selection memory means corresponding to information items whose selection is to be inhibited, and means responsive to selection of all of said information items for inactivating said enabling means.

9. A time selector for selectively transmitting recurring items of stored information comprising means for generating time-identification information groups corresponding to those of said recurring items of information as are unavailable for selection, a plurality of selection control means each corresponding to one of said information items, said selection control means activated by a set of recurring clocked information and subsequently deactivated in response to a corresponding time-identification information group, a precedence array actuated subsequent to deactivation of said selection control means for deactivating those of the activated selection control means corresponding to items of lower instantaneous precedence, output means connected to the selection control means associated with the item of highest instantaneous precedence for deriving output information indicative of the particular information item to be selected, and selection memory means responsive to said output information for inhibiting further derivation of output information from the last-named selection control means until output information has been derived corresponding to all of said information items.

10. A time selector for selectively transmitting recurring items of stored information comprising means for generating time-identification information groups corresponding to those of said recurring items of information as are unavailable for selection, a plurality of selection control means each corresponding to one of said information items, said selection control means activated by a set of recurring clocked information and subsequently deactivated in response to a corresponding time-identification information group, a precedence array actuated subsequent to deactivation of said selection control means for deactivating those of the activated selection control means corresponding to items of lower instantaneous precedence, output means connected to the selection control means associated with the item of highest instantaneous precedence for deriving output information indicative of the particular information item to be selected, selection memory means responsive to said output information for inhibiting further derivation of output information from the last-named selection control means until output information has been derived corresponding to all of said information items, and selection voiding means operable prior to the derivation of output information for activating said selection memory means corresponding to information items whose selection is to be inhibited.

11. A time selector for selectively transmitting recurring items of stored information comprising enabling means including a source of master start information for presenting said items of information for selection, means for generating time-identification information groups corresponding to those of said recurring items of information as are unavailable for selection, a plurality of selection control means each corresponding to one of said information items, said selection control means activated by a set of recurring clocked information and subsequently deactivated in response to a corresponding time-identification information group, a precedence array actuated subsequent to deactivation of said selection control means for deactivating those of the activated selection control means corresponding to items of lower instantaneous precedence, output means connected to the selection control means associated with the item of highest instantaneous precedence for deriving output information indicative of the particular information item to be selected, selection memory means responsive to said output information for inhibiting further derivation of output information from the last-named selection control means until output information has been derived corresponding to all of said information items, and means responsive to selection of all of said information items for inactivating said enabling means.

12. A time selector for selectively transmitting recurring items of stored information comprising enabling means including a source of master start information for presenting said items of information for selection, means for generating time-identification information groups corresponding to those of said recurring items of information as are unavailable for selection, a plurality of selection control means each corresponding to one of said information groups, said selection control means activated by a set of recurring clocked information and subsequently deactivated in response to a corresponding time-identification information group, a precedence array actuated subsequent to deactivation of said selection control means for deactivating those of the activated selection control means corresponding to items of lower instantaneous precedence, output means connected to the selection control means associated with the item of highest instantaneous precedence for deriving output information indicative of the particular information item to be selected, and selection memory means responsive to said output information for inhibiting further derivation of output information from the last-named selection control means until output information has been derived corresponding to all of said information items, and selection voiding means operable prior to the derivation of output information for activating said selection memory means corresponding to information items whose selection is to be inhibited, and means responsive to selection of all of said information items for inactivating said enabling means.

13. A time selector for selectively transmitting recurring items of stored information comprising means for generating time-identification information indicating which of said recurring items of information are available for selection, selection control means corresponding to said time-identification information and activated whenever a corresponding information item is available for selection, basic precedence means activated subsequent to said activation of said selection control means for deactivating those of the activated selection control means associated with items of lower precedence, auxiliary time-identification means operable during the presence of items of information to be selected specially, auxiliary precedence means cooperating with said auxiliary time-identification means for modifying the action of said basic precedence means, output means connected to the selection control means associated with the item of information of highest instantaneous precedence for deriving output information indicative of the particular information item to be selected, and selection memory means responsive to said output information for inhibiting further derivation of output from said last-named selection control means until output information has been derived corresponding to all of said information items.

14. A time selector for selectively transmitting recurring items of stored information comprising means for generating time-identification information indicating which of said recurring items of information are available for selection, selection control means corresponding to said time-identification information and activated whenever a corresponding information item is available for selection, basic precedence means activated subsequent to said activation of said selection control means for deactivating those of the activated selection control means associated with items of lower precedence, auxiliary time-identification means operable during the presence of items of information to be selected specially, auxiliary precedence means cooperating with said auxiliary time-identification means for modifying the action of said basic precedence means, output means connected to the selection control means associated with the item of information of highest instantaneous precedence for deriving output information indicative of the particular information item to be selected, selection memory means responsive to said output information for inhibiting further derivation of output from said last-named selection control means until output informaton has been derived corresponding to all of said information items, and selection voiding means operable prior to the derivation of output information for activating said selection memory means corresponding to items of information whose selection is to be inhibited.

15. A time selector for selectively transmitting recurring items of stored information comprising enabling means including a source of master start information for presenting said items of information for selection, means for generating time-identification information indicating which of said recurring items of information are available for selection, selection control means corresponding to said time-identification information and activated whenever a corresponding information item is available for selection, basic precedence means activated subsequent to said activation of said selection control means for deactivating those of the activated selection control means associated with items of lower precedence, auxiliary time-identification means operable during the presence of items of information to be selected specially, auxiliary precedence means cooperating with said auxiliary time-identification means for modifying the action of said basic precedence means, output means connected to the selection control means associated with the item of information of highest instantaneous precedence for deriving output information indicative of the particular information item to be selected, and selection memory means responsive to said output information for inhibiting further derivation of output from said last-named selection control means until output information has been derived corresponding to all of said information items.

16. A time selector for selectively transmitting recurring items of stored information comprising enabling means including a source of master start information for presenting said items of information for selection, means for generating time-identification information indicating which of said recurring items of information are available for selection, selection control means corresponding to said time-identification information and activated whenever a corresponding information item is available for selection, basic precedence means activated subsequent to said activation of said selection control means for deactivating those of the activated selection control means associated with items of lower precedence, auxiliary time-identification means operable during the presence of items of information to be selected specially, auxiliary precedence means cooperating with said auxiliary time-identification means for modifying the action of said basic precedence means, output means connected to the selection control means associated with the item of information of highest instantaneous precedence for deriving output information indicative of the particular information item to be selected, selection memory means responsive to said output information for inhibiting further derivation of output from said last-named selection control means until output information has been derived corresponding to all of said information items, selection voiding means operable prior to deviation of output information for activating said selection memory means corresponding to items of information whose selection is to be inhibited, and means responsive to deviation of output information from all of said output means for inactivating said enabling means.

17. A time selector for selectively transmitting recurring items of stored information comprising means for generating time-identification information indicating which of said recurring items of information are avalable for selecton, selection control means corresponding to said time-identification information and activated whenever a corresponding information item is available for selection, basic precedence means activated subsequent to said activation of said selection means for establishing a normal precedence relationship among said information items whenever all information items are to be selected regularly, auxiliary time-identification means operable during the presence of special information items, auxiliary precedence means cooperating with operable ones of said auxiliary time-identification means for realizing precedence relations among said regular and special items of information differing from said normal precedence relationship, output means connected to the selection control means associated with the item of information of highest instantaneous precedence for deriving output information indicative of the particular information item to be selected, and selection memory means responsive to said output information for inhibiting further derivation of output from said last-named selection control means until output information has been derived corresponding to all of said information items.

18. A time selector for selectively transmitting recurring items of stored information comprising means for generating time-identification information indicating which of said recurring items of information are available for selection, selection control means corresponding to said time-identification information and activated whenever a corresponding information item is available for selection, basic precedence means activated subsequent to said activation of said selection means for establishing a normal precedence relationship among said information items whenever all information items are to be selected regularly, auxiliary time-identification means operable during the presence of special information items, auxiliary precedence means cooperating with operable ones of said auxiliary time-identification means for realizing precedence relations, among said regular and special items of information differing from said normal precedence relationship, output means connected to the selection control means associated with the item of information of highest instantaneous precedence for deriving output information indicative of the particular information item to be selected, selection memory means responsive to said output information for inhibiting further derivation of output from said last-named selection control means until output information has been derived corresponding to all of said information items, and selection voiding means operable prior to the derivation of output information for activating those of said selection memory means corresponding to the information items whose selection is to be inhibited.

19. A time selector for selectively transmitting recurring items of stored information comprising enabling means including a source of master start information for presenting said items of information for selection, means for generating time-identification information indicating which of said recurring items of information are available for selection, selection control means corresponding to said time-identification information and activated whenever a corresponding information item is available for selection, basic precedence means activated subsequent to said activation of said selection means for establishing a normal precedence relationship among said information items whenever all information items are to be selected regularly, auxiliary time-identification means operable during the presence of special information items, auxiliary precedence means cooperating with operable ones of said auxiliary time-identification means for realizing precedence relations among said regular and special items of information differing from said normal precedence relationship, output means connected to the selection control means associated with the item of information of highest instantaneous precedence for deriving output information indicative of the particular information item to be selected, selection memory means responsive to said output information for inhibiting further derivation of output from said last-named selection control means until output information has been derived corresponding to all of said information items, and means responsive to derivation of output information from all of said output means for inactivating said enabling means.

20. A time selector for selectively transmitting recurring items of stored information comprising enabling means including a source of master start information for presenting said items of information for selection, means for generating time-identification information indicating which of said recurring items of information are available for selection, selection control means corresponding to said time-identification information and activated whenever a corresponding information item is available for selection, basic precedence means activated subsequent to said activation of said selection means for establishing a normal precedence relationship among said information items whenever all information items are to be selected regularly, auxiliary time-identification means operable during the presence of special information items, auxiliary precedence means cooperating with operable ones of said auxiliary time-identification means for realizing precedence relations among said regular and special items of information differing from said normal precedence relationship, output means connected to the selection control means associated with the item of information of highest instantaneous precedence for deriving output information indicative of the particular information item to be selected, selection memory means responsive to said output information for inhibiting further derivation of output from said last-named selection control means until output information has been derived corresponding to all of said information items, means responsive to derivation of output information from all of said output means for inactivating said enabling means, and selection voiding means operable prior to the derivation of output information for activating those of said selection memory means corresponding to the information items whose selection is to be inhibited.

21. A time selector for selectively transmitting simultaneously only one recurring item of information from among several simultaneously occurring items of information comprising enabling means including a source of master start information for presenting said items of information for selection, a plurality of bistable selection control devices each responsive to time-identification information indicating which of said recurring information items are available for selection, a plurality of bistable selection memory devices corresponding to said selection control devices, said bistable devices each having an active state and an inactive state and productive of an output only when in said active state, said selection control devices assuming one of the aforesaid states depending upon the character of said time-identification information, precedence means energized by the output of the activated selection control devices for rendering inactive those of said selection control devices corresponding to information items of lower instantaneous precedence, output means responsive to the output of said selection control device remaining active which corresponds to the information item of highest instantaneous precedence for deriving output information indicative of the particular information item to be selected, means responsive to said output information for rendering active said corresponding selection memory device, means responsive to the activation of said selection memory device for inactivating said corresponding selection control device, and means responsive to selection of all of said information items for inactivating said enabling means and said selection memory devices.

22. A time selector for selectively transmitting simultaneously only one recurring item of information from among several simultaneously occurring items of information comprising enabling means including a source of master start information for presenting said items of information for selection, a plurality of bistable selection control devices each responsive to time-identification information indicating which of said recurring information items are available for selection, a plurality of bistable selection memory devices corresponding to said selection control devices, said bistable devices each having an active state and an inactive state and productive of an output only when in said active state, said selection control devices assuming one of the aforesaid states depending upon the character of said time-identification information, means for driving first, second and third sets of clocked information recurring at a fixed recurrence rate in the order named and bearing a fixed time relation to said time-identification information, precedence means energized by the output of the activated selection control devices and to said second set of clocked information for rendering inactive those of the activated selection control devices corresponding to infromation items of lower instantaneous precedence, output means responsive to the output of said selection control device remaining active which corresponds to the information item of highest instantaneous precedence and to said third set of clocked information for deriving output information indicative of the particular information item to be selected, means responsive to said output information for rendering active said corresponding selection memory device, means responsive to the activation of said selection memeory device and to said first set of clocked information for inactivating said corresponding selection control device until output information is derived corresponding to all of said information items, and means responsive to selection of all of said information items for inactivating said enabling means.

23. A time selector for selectively transmitting simultaneously only one recurring item of information from among several simultaneously occurring items of information comprising enabling means including a source of master start information for presenting said items of information for selection, a plurality of bistable selection control devices each responsive to time-identification information indicating which of said recurring information items are available for selection, a plurality of bistable selection memory devices corresponding to said selection control devices, said bistable devices each having an active state and an inactive state and productive of an output only when in said active state, said selection control devices assuming one of the aforesaid states depending upon the character of said time-identification information, means for deriving first and second sets of clocked information recurring at a fixed recurrence rate in the order named and bearing a fixed time relation to said time-identification information, precedence means energized by the output of the activated selection control devices and to said first set of clocked information for rendering inactive those of the activated selection control devices corresponding to information items of lower instantaneous precedence, output means responsive to the output of said selection control device remaining active which corresponds to the information item of highest instantaneous precedence and to said second set of clocked information for deriving output information indicative of the particular information item to be selected, said selection memory device being responsive to said output information for inactivating said corresponding selection control device until output information is derived corresponding to all of said information items, and means responsive to selection of all of said information items for inactivating said enabling means and said selection memory devices.

24. A time selector for selectively transmitting simultaneously only one recurring item of information from among several simultaneously occurring items of information comprising enabling means including a source of master start information for presenting said items of information for selection, a plurality of bistable selection control devices each responsive to time-identification information indicating which of said recurring information items are available for selection, a plurality of bistable selection memory devices corresponding to said selection control devices, said bistable devices each having an active state and an inactive state and productive of an output only when in said active state, said selection control devices assuming one of the aforesaid states depending upon the character of said time-identification information, means for deriving a set of clocked information recurring at a fixed recurrence rate in the order named and bearing a fixed time relation to said time-identification information, precedence means energized by the output of the activated selection control devices for rendering inactive those of the activated selection control devices corresponding to information items of lower instantaneous precedence, output means responsive to the output of said selection control device remaining active which corresponds to the information item of highest instantaneous precedence and to said set of clocked information for deriving output information indicative of the particular information item to be selected, said selection memory device being responsive to said output information for inactivating said corresponding selection control device until output information is derived corresponding to all of said information items, and means responsive to selection of all of said information items for inactivating said enabling means and said selection memory devices.

25. A time selector for selectively transmitting simultaneously only one recurring item of information from among several simultaneously occurring items of information comprising enabling means including a source of master start information for presenting said items of information for selection, a plurality of bistable selection control devices each responsive to time-identification groups of information indicating which of said recurring information items are available for selection, a plurality of bistable selection memory devices corresponding to said selection control devices, said bistable devices each having an active state and an inactive state and productive of an output only when in said active state, said selection control devices assuming one of the aforesaid states depending upon the character of said time-identification information, means for deriving first, second and third sets of clock information recurring at a fixed recurrence rate in the order named and bearing a fixed time relation to said time-identification information, precedence means energized by the output of the activated selection control devices and to said second set of clocked information for rendering inactive those of said selection control devices corresponding to information items of lower instantaneous precedence, output means responsive to the output of said selection control device remaining active which corresponds to the information item of highest instantaneous precedence and to said third set of clocked information for deriving output information indicative of the particular information item to be selected, means responsive to said output information for rendering active said corresponding selection memory device, means responsive to the activation of said selection memory device and to said first set of clocked information for inactivating said corresponding selection control device until output information is derived corresponding to all of said information items, means responsive to selection of all of said information items for inactivating said enabling means, and selection voiding means operable prior to the derivation of output information for inactivating those of said selection memory means corresponding to information items whose selection is to be inhibited.

26. A time selector for selectively transmitting recurring items of stored information comprising enabling means including a source of master start information for presenting said information items for selection, a plurality of selection control means activated whenever said corresponding information items are available for selection, as determined by time-identifying information, means for deriving clocked information occurring at a fixed recurrence rate and bearing a fixed time relation to said time-identifying information, precedence means energized by the output of those of the activated selection control means for rendering inactive those of said selection control means corresponding to information items of lower instantaneous precedence, means responsive to the output of the selection control means remaining active which corresponds to the information item of highest instantaneous precedence and to said clocked information for deactivating said enabling means and for maintaining active the last-named selection control means until the next occurrence of said clocked information, means responsive to said next occurrence of said clocked information and to the inactivity of said enabling means for deriving output information from said last-named selection control means indicative of the particular information item to be selected and for reactivating said enabling means, selection memory means responsive to said output information for inhibiting further derivation of output from said last-named selection control means until output information is derived corresponding to all of said information items, and means responsive to said clocked information and to the derivation of output information from all of said information items for again deactivating said enabling means.

27. A time selector for selectively transmitting recurring items of stored information comprising enabling means including a source of master start information for presenting said information items for selection, a plurality of selection control means each activated whenever said corresponding information items are available for selection, as determined by time-identifying information, means for deriving first and second sets of clocked information occurring at a fixed recurrence rate in the order named and bearing a fixed time relation to said time-identifying information, precedence means energized by the output of those of the activated selection control means and to said first set of clocked information for rendering inactive those of said selection control means corresponding to information items of lower instantaneous precedence, means responsive to the output of the selection control means remaining active which corresponds to the information item of highest instantaneous precedence and to said second set of clocked information for deactivating said enabling means and for maintaining active the last-named selection control means until the next occurrence of said second set of clocked information, means responsive to said next occurrence of said second set of clocked information and to the inactivity of said enabling means for deriving output information from said last-named selection control means indicative of the particular information items to be selected and for reactivating said enabling means, selection memory means responsive to said output information for inhibiting further derivation of output from said last-named selection control means until output information is derived corresponding to all of said information items, and means responsive to said second set of clocked information and responsive to the derivation of output information from all of said information items for again deactivating said enabling means.

28. A time selector for selectively transmitting recurring items of stored information comprising enabling means including a source of master start information for presenting said information items for selection, a plurality of selection control means activated whenever said corresponding information items are available for selection, as determined by time-identifying information, clocked information occurring at a fixed recurrence rate and bearing a fixed time relation to said time-identifying information, basic precedence means activated subsequent to said activation of said selection control means for rendering inactive those of the activated selection control means corresponding to information items of lower instantaneous precedence, auxiliary time-identification means operable during the presence of items of information to be selected specially, auxiliary precedence means cooperating with said auxiliary time-identification means for modifying the action of the basic precedence means, means responsive to the output of the selection control means remaining active which corresponds to the information item of highest instantaneous precedence and to said clocked information for deactivating said enabling means and for maintaining active the last-named selection control means until the next occurence of said clocked information, means responsive to said next occurrence of said clocked information and to the inactivity of said enabling means for deriving output information from said last-named selection control means indicative of the particular information item to be selected and for reactivating said enabling means, selection memory means responsive to said output information for inhibiting further derivation of output from said last-named selection control means until output information is derived corresponding to all of said information items, and means responsive to said clocked information and to the derivation of output information from all of said information items for deactivating said enabling means.

29. A time selector for selectively transmitting primary sets of recurring items of stored information prior to subsidiary sets of recurring items of stored information comprising a plurality of selection control means each activated whenever said corresponding information items are available for selection, priority control means set up in response to a condition pre-existing the activation of said selection control means for subsequently effecting deactivation of said selection control means corresponding to subsidiary sets of information items until the derivation of output information associated with all of said primary information items, a precedence array actuated subsequent to operation of said priority control means in response to the output of the activated selection control means for deactivating those of the activated selection control means corresponding to information items of lower instantaneous precedence, output means connected to those of said selection control means associated with the information item of highest instantaneous precedence for deriving output information indicative of the particular information item to be selected, a plurality of selection memory means actuated in response to otuput information from a corresponding selection control means for inhibiting further derivation of output information from said last-named selection means until output information has been derived corresponding to all of said information items, said priority control means further responsive to the outputs derived from said selection control means and said corresponding selection memory means corresponding to primary information items, and means included in said priority control means for permitting the derivation of output information in a sequence partialy determined by said precedence array from said output means corresponding to said subsidiary information items after output information has been derived from all output means corresponding to said primary information items.

30. A time selector for selectively transmitting sets of recurring items of stored information prior to subsidiary sets of recurring items of stored information comprising a plurality of selection control means each corresponding to one of said information items and activated whenever said corresponding information items are available for selection, priority control means set up in response to a condition pre-existing the activation of said selection control means for subsequently effecting deactivation of said selection control means corresponding to said subsidiary sets of information items, first output means connected to the selection control means associated with the primary information item of highest instantaneous precedence for deriving first output information indicative of the particular information item to be selected, a plurality of selection memory means actuated in response to said first output information from a corresponding selection control means for inhibiting further derivation of output information from said last-named selection control means until output information has been derived corresponding to all of said information items, said priority control means further responsive to the outputs derived from said selection control elements and said corresponding selection memory means corresponding to primary information items, and means included in said priority control means for inhibiting the deactivation of those of said selection control means corresponding to subsidiary information items after output information has been derived from the first output means corresponding to the last of said primary information items in a given set, and second output means connected to those of said selection control means corresponding to subsidiary information items for deriving second output information which is indicative of the subsidiary information items to be selected subsequent to the derivation of output information associated with all of said primary information items.

31. A time selector for selectively transmitting primary sets of recurring items of stored information prior to subsidiary sets of recurring items of storing information comprising enabling means including a source of master start information for presenting said items of information for selection, a plurality of selection control means each activated whenever said corresponding information item is available for selection, as determined by time-identification information, means for deriving clocked information occurring at a fixed recurrence rate and bearing a fixed time relation to said time-identification information, priority control means set up in response to a condition pre-existing the activation of said selection control means for subsequently effecting deactivation of said selection control means corresponding to said subsidiary sets of information items until the derivation of output information associated with all of said primary information items, precedence means actuated subsequent to operation of said priority control means in response to the output of the activated selection control means for deactivating those of the activated selection control means corresponding to information items of lower instantaneous precedence, output means connected to those of said selection control means associated with the primary information item of highest instantaneous precedence and to said clocked information for deactivating said enabling means and for maintaining active the last-named selection control means until the next occurrence of said clocked information, means responsive to said next occurrence of said clocked information and to the inactivity of said enabling means for deriving output information from said last-named selection control means indicative of the particular information item to be selected and for reactivating said enabling means, a plurality of selection memory means activated in response to output information from a corresponding selection control means for inhibiting further derivation of output information from said last-named selection control means until output information has been derived corresponding to all of said information items, said priority control means further responsive to the outputs derived from said selection control means and from said corresponding selection memory means corresponding to primary information items, and means included in said priority control means for permitting the derivation of output information from said output means corresponding to subsidiary information items after output information has been derived from all output means corresponding to said primary information items in a given set, and means responsive to said clocked information and to the derivation of output information from all of said information items for again deactivating said enabling means.

32. A time selector for selectively transmitting primary sets of recurring items of stored information prior to subsidiary sets of recurring items of storing information comprising enabling means including a source of master start information for presenting said items of information for selection, a plurality of selection control means each activated whenever said corresponding information item is available for selection, as determined by time-identification information, means for deriving clocked information occurring at a fixed recurrence rate and bearing a fixed time relation to said time-identification information, priority control means set up in response to a condition pre-existing the activation of said selection control means for subsequently effecting deactivation of said selection control means corresponding to said subsidiary sets of information items until the derivation of output information associated with all of said primary information items, precedence means actuated subsequent to operation of said priority control means in response to the output of the activated selection control means for deactivating those of the activated selection control means corresponding to information items of lower instantaneous precedence, output means connected to those of said selection control means associated with the primary information item of highest instantaneous precedence and to said clocked information for deactivating said enabling means and for maintaining active the last-named selection control means until the next occurrence of said clocked information, means responsive to said next occurrence of said clocked information and to the inactivity of said enabling means for deriving output information from said last-named selection control means indicative of the particular information item to be selected and for re-activating said enabling means, a plurality of selection memory means activated in response to output information from a corresponding selection control means for inhibiting further derivation of output information from said last-named selection control means until output information has been derived corresponding to all of said information items, said priority control means further responsive to the outputs derived from said selection control means and from said corresponding selection memory means corresponding to primary information items, and means included in said priority control means for permitting the derivation of output information from said output means corresponding to subsidiary information items after output information has been derived from all output means corresponding to said primary information items in a given set, means responsive to said clocked information and to the derivation of output information from all of said information items for again deactivating said enabling means, and selection voiding means operable prior to the activation of said corresponding selection control means for activating said selection memory means corresponding to information items whose selection is to be inhibited.

33. A time selector for selectively transmitting any existing primary sets of recurring items of stored information prior to any existing subsidiary sets of stored information and for selecting any existing special items of information in preference to all other items comprising a plurality of selection control elements activated by time-identification information indicating which of said corresponding information items are available for selection, priority control means set up in response to a desired condition of priority pre-existing the activation of said selection control elements for subsequently effecting deactivation of those of said selection control elements corresponding to said subsidiary information items, basic precedence means actuated subsequent to operation of said priority control means for deactivating those of the activated selection control elements corresponding to information items of lower instantaneous precedence, auxiliary time-identification means actuated in response to a desired condition of speciality, auxiliary precedence means operable in response to said auxiliary time-identification means for modifying the activity of said basic precedence means, output means connected to the selection control element associated with the information item of highest instantaneous precedence for deriving output information indicative of the particular information item to be selected, a plurality of selection memory means activated in response to output information from a corresponding selection control element for inhibiting further derivation of output information from said last-named selection control element until output information has been derived corresponding to all of said information items, said priority control means further responsive when set up to the outputs derived from those of said selection control elements and said selection memory means corresponding to primary sets of information items, and means included in said priority control means for inhibiting the deactivation of said selection control elements corresponding to subsidiary information items after output information has been derived from the selection control element corresponding to the last of said primary items in a given set.

34. A time selector for selectively transmitting any existing primary sets of recurring items of stored information prior to any existing subsidiary sets of stored information and for selecting any existing special items of information in preference to all other items comprising enabling means including a master start pulse for presenting said information items for selection, a plurality of selection control elements activated by time-identification information indicating which of said corresponding information items are available for selection, priority control means set up in response to a desired condition of priority pre-existing said master start pulse for subsequently effecting deactivation of those of said selection control elements corresponding to said subsidiary information items, basic precedence means actuated subsequent to operation of said priority control means for deactivating those of the activated selection control elements corresponding to information items of lower instantaneous precedence, auxiliary time-identification means actuated in response to a desired condition of speciality occurring prior to said master start pulse, auxiliary precedence means operable in response to said auxiliary time-identification means for modifying the activity of said basic precedence means, output means connected to the selection control element associated with the information item of highest instantaneous precedance for deriving output information indicative of the particular information item to be selected, a plurality of selection memory means activated in response to output information from a corresponding selection control element for inhibiting further derivation of output information from said last-named selection control element until output information has been derived corresponding to all of said information items, said priority control means further responsive when set up to the outputs derived from those of said selection control elements and said selection memory means corresponding to primary sets of information items, means included in said priority control means for inhibiting the deactivation of said selection control elements corresponding to subsidiary information items after output information has been derived from the selection control element corresponding to the last of said primary items in a given set, and means responsive to the derivation of output information from all of said information items for deactivating said enabling means.

35. A device for establishing an order of selection of memory cells of a serial memory in accordance with first and second addresses comprising means for generating a master start pulse for presenting said information items for selection, a pair of sources of time-identification pulses each associated with one of said addresses and indicating which of the memory cells to which that address refers is available for selection, first and second selection control devices corresponding, respectively, to said first and second addresses and activated whenever corresponding memory cells are available for selection, means for deriving first, second, third, fourth, and fifth clock pulses occurring at a fixed recurrence rate in the order named during each minor cycle and bearing a fixed time relation to said time-identification pulses, said identification pulses arriving prior to said first clock pulse, first and second auxiliary bistable devices corresponding, respectively, to said first and second addresses, input control pulses occurring prior to said master start pulse whenever a corresponding address is to be made special for rendering active said corresponding auxiliary bistable device, first and second gates each opened in response to the output of the first and second auxiliary bistable devices, respectively, means for applying said first clock pulse to said first gate for rendering active said first selection control device, if not already active, whenever said first address is special, means for applying said third clock pulse to said second gate for rendering active said second selection control device, if not already active, whenever said second address is special, a first precedence gate opened by the output of said first selection control device and responsive to said second clock pulse for insuring deactivation of said second selection control device whenever said first selection control device is active, a second precedence gate opened by the output of said second selection control device and responsive to said fourth clock pulse for insuring deactivation of said first selection control device whenever said second control device is active, a set of output gates associated with a corresponding selection control device, means including the ouput gate associated with the selection control device remaining active and responsive to said fifth clock pulse for deriving output information indicative of the memory cells associated with one of said addresses, a plurality of bistable selection memory means each corresponding to one of said selection control devices and responsive to the derivation of said output information for rendering inactive the corresponding selection control device responsible for derivation of said output information and for deactivating the auxiliary bistable device corresponding to said one address until ouput information has been derived corresponding to both of said information items, means including said output gate associated with the other of said selection control devices for subsequently deriving output information indicative of the memory cells associated with said other address.

36. A device for establishing an order of selection of serial memory cells in accordance with addresses comprising means for generating a master start pulse, a plurality of sources of time-identification pulses each associated with one of said addresses and indicative of the time of unavailability of the memory cells to which that address refers, a bistable selection control device for each of said time-identification pulses, said selection control devices each having an active state and an inactive state and each productive of an output only when in said active state, means for deriving first, second, third, and fourth clock pulses following each other in the order named and occurring in the same relative position during each minor cycle, said identification pulses arriving between said first and second clock pulses in point of time, means responsive to said first clock pulses and to said master start pulse for rendering active said selection control devices, means for applying available ones of said time-identification pulses to said corresponding selection control devices to render the latter inactive, a first set of gates each responsive to the output of a corresponding selection control device and to said third clock pulses for rendering inactive those of said activated selection control devices corresponding to memory cells whose order of selection is lower, a set of output gates each opened by the output of that one of said corresponding selection control devices which remains active and responsive to said fourth clock pulse for transmitting said fourth clock pulse through said corresponding one of said output gates, a plurality of bistable selection memory means each corresponding to one of said selection control devices, said memory means being responsive to said transmission of said fourth clock pulse for deriving an output therefrom, a set of selection memory gates each responsive to said output of said selection memory means and to said second clock pulse for rendering inactive the corresponding selection control device after transmission through said corresponding output gate has been accomplished.

37. A device for establishing an order of selection of serial memory cells in accordance with addresses comprising means for generating a master start pulse, a plurality of sources of time-identification pulses each associated with one of said addresses and indicative of the time of unavailability of the memory cells to which that address refers, a bistable selection control device for each of said time-identification pulses, said selection control devices each having an active state and an inactive state and each productive of an output only when in said active state, means for deriving first, second and third clock pulses following each other in the order named and occurring in the same relative position during each minor cycle, said identification pulses arriving between said first and second clock pulses in point of time, means responsive to said first clock pulses and to said master start pulse for rendering active said selection control devices, means for applying available ones of said time-identification pulses to said corresponding selection control devices to render the latter inactive, a first set of gates each responsive to the output of a corresponding selection control device and said second clock pulses for rendering inactive those of said activated selection control devices corresponding to memory cells whose order of selection is lower, a set of output gates each opened by the output of that one of said corresponding selection control devices which remain active and responsive to said third clock pulse for transmitting said third clock pulse through said corresponding one of said output gates, a plurality of bistable selection memory means each corresponding to one of said selection control devices for rendering inactive the corresponding selection control device after transmission through said corresponding output gate has been accomplished until output information has been derived corresponding to all of said addresses.

38. A device for establishing an order of selection of serial memory cells in accordance with addresses comprising means for generating a master start pulse, a plurality of sources of time-identification pulses each associated with one of said addresses and indicative of the time of availability of the memory cell to which that address refers, a bistable selection control device for each of said time-identification pulses, said selection control devices each having an active state and an inactive state and each productive of an output only when in said active state, means for deriving first, second and third clock pulses following each other in the order named and occurring in the same relative position during each minor cycle, said identification pulses arriving between said master start pulse and said first clock pulse in point of time, means responsive to said master start pulse and available ones of said time-identification pulses for rendering active said corresponding selection control devices, a first set of gates each responsive to the output of a corresponding selection control device and said second clock pulses for rendering inactive those of said activated selection control devices corresponding to memory cells whose order of selection is lower, a set of output gates each opened by the output of that one of said corresponding selection control device which remains active and responsive to said third clock pulse for transmitting said third clock pulse through a corresponding one of said output gates, a plurality of bistable selection memory means each corresponding to one of said selection control devices, said memory means being responsive to said transmission of said fourth clock pulse for deriving an output therefrom, a set of selection memory gates each responsive to said output of said selection memory means and said first clock pulse for rendering inactive the corresponding selection control device after transmission through said corresponding output gate has been accomplished.

39. A device for establishng an order of selection of serial memory cells in accordance with addresses comprising means for generating a master start pulse, a plurality of sources of time-identification pulses each associated with one of said addresses and indicative of the time of availability of the memory cells to which that address refers, a bistable selection control device for each of said time-identification pulses, said selection control devices each having an active state and an inactive state and each productive of an output only when in said active state, means for deriving first and second clock pulses following each other in the order named and occurring in the same relative position during each minor cycle, said identification pulses arriving between said master start pulse and said first clock pulses in point of time, means responsive to said master start pulse and available ones of said time-identification pulses for rendering active said corresponding selection control devices, a first set of gates each responsive to the output of a corresponding selection control device and said first clock pulses for rendering inactive those of said activated selection control devices corresponding to memory cells whose order of selection is lower, a set of output gates each opened by the output of that one of said corresponding selection control device which remains active and responsive to said second clock pulse for transmitting said second clock pulse through a corresponding one of said output gates, a plurality of bistable selection memory means each corresponding to one of said selection control devices for rendering inactive the corresponding selection control device after transmission through said corresponding output gate has been accomplished until output information has been derived corresponding to all of said addresses.

40. A device for establishing an order of selection of serial memory cells in accordance with addresses comprising means for generating a master start pulse, a plurality of sources of time-identification pulses each associated with one of said addresses and indicative of the time of availability of the memory cells to which that address refers, a bistable selection control device for each of said time-identification pulses, said selection control devices each having an active state and an inactive state and each productive of an output only when in said active state, means for deriving first, and second clock pulses following each other in the order named and occurring in the same relative position during each minor cycle, said identification pulses arriving between said master start pulse and said first clock pulse in point of time, means responsive to said pulses and available ones of said identification pulses for rendering active those of said selection control devices corresponding to addresses whose memory cells are available during the current minor cycle, a first set of gates each responsive to the output of a corresponding selection control device and said first clock pulses for rendering inactive those of said selection control devices corresponding to memory cells whose order of selection is lower, a set of output gates each opened by the output of that one of said corresponding selection control devices which remain active and responsive to said second clock pulse for transmitting said second clock pulse through a corresponding one of said output gates, a plurality of bistable selection memory means each corresponding to one of said selection control devices for rendering inactive the corresponding selection control device after transmission through said corresponding output gate has been accomplished.

References Cited in the file of this patent
UNITED STATES PATENTS

| | | |
|---|---|---|
| 1,695,908 | White et al. | Dec. 18, 1928 |
| 2,082,550 | Powell | June 1, 1937 |
| 2,289,789 | Lewis | July 14, 1942 |
| 2,391,246 | Kenney | Dec. 18, 1945 |
| 2,540,654 | Cohen et al. | Feb. 6, 1951 |
| 2,674,733 | Robbins | Apr. 6, 1952 |
| 2,764,750 | Wright et al. | Sept. 25, 1956 |